United States Patent
Sakano et al.

(10) Patent No.: US 7,159,225 B2
(45) Date of Patent: Jan. 2, 2007

(54) DISC DEVICE WITH DISC CHANGER

(75) Inventors: Kenji Sakano, Fukui (JP); Masahiko Nishide, Fukui (JP); Masahide Moroishi, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 408 days.

(21) Appl. No.: 10/854,340

(22) Filed: May 27, 2004

(65) Prior Publication Data

US 2004/0240330 A1   Dec. 2, 2004

(30) Foreign Application Priority Data

| May 30, 2003 | (JP) | ............................ 2003-153598 |
| Jun. 27, 2003 | (JP) | ............................ 2003-184675 |
| Jun. 27, 2003 | (JP) | ............................ 2003-184686 |
| Jun. 27, 2003 | (JP) | ............................ 2003-184693 |

(51) Int. Cl.
   *G11B 17/04* (2006.01)
   *G11B 33/02* (2006.01)

(52) U.S. Cl. ..................... 720/614; 369/30.92; 720/608

(58) Field of Classification Search ..................... None
   See application file for complete search history.

(56) References Cited

U.S. PATENT DOCUMENTS

| 5,226,032 | A | * | 7/1993 | Ikedo et al. | ............. 369/30.92 |
| 5,327,412 | A | * | 7/1994 | Lee | ............. 720/614 |
| 5,504,733 | A | * | 4/1996 | Nakamichi | ............. 720/614 |
| 5,740,135 | A | * | 4/1998 | Nakagawa et al. | ............. 369/30.3 |
| 5,784,344 | A | * | 7/1998 | Ahn | ............. 369/30.9 |
| 5,802,021 | A | * | 9/1998 | Mukaida | ............. 369/30.32 |
| 5,878,016 | A | * | 3/1999 | Kubokawa et al. | ............. 369/30.95 |
| 5,963,533 | A | * | 10/1999 | Motoki et al. | ............. 720/613 |
| 5,970,036 | A | * | 10/1999 | Matsugase | ............. 720/614 |
| 6,141,314 | A | * | 10/2000 | Umesaki et al. | ............. 369/30.92 |
| 6,301,219 | B1 | * | 10/2001 | Kondo et al. | ............. 720/614 |

(Continued)

FOREIGN PATENT DOCUMENTS

JP    10-134474    5/1998

(Continued)

*Primary Examiner*—Brian E. Miller
(74) *Attorney, Agent, or Firm*—Wenderoth, Lind & Ponack, L.L.P.

(57) ABSTRACT

To achieve a disc device with a disc changer in which number of motors is reduced, and a quiet and stable switching operation, accurate positioning of a sub-tray, smooth clamp and release of a disc are possible, only a first motor for driving a main tray and a second motor for driving the sub-tray are used as driving sources, and a gear switching mechanism is provided, in which driving channels of the first and second motors can be disconnected. The gear switching mechanism comprises a first cam gear having first and second cam grooves formed therein and rotationally driven by the first motor; a clutch lever installed in a back-and-forth swingable manner around a pivot fixed to a body frame and a back edge fitted slidably into the first cam groove in the first cam gear; a second cam gear having a cam groove formed therein and connected to a traverse-unit moving unit via the cam groove; and a clutch gear pivotally supported by a front edge of the clutch lever and capable of switching of connection to a channel including a transmission gear engaging with a sub-tray rack for conveying the sub-tray to the playback position, or to a channel including the second cam gear and transmission gears connected to the second motor.

11 Claims, 18 Drawing Sheets

U.S. PATENT DOCUMENTS

| | | | |
|---|---|---|---|
| 6,359,843 B1* | 3/2002 | Motoki | 369/30.92 |
| 6,633,518 B1* | 10/2003 | Minote | 369/30.93 |
| 6,639,880 B1* | 10/2003 | Nagasaka et al. | 369/30.85 |
| 6,728,168 B1* | 4/2004 | Kido | 369/30.9 |
| 2003/0161225 A1* | 8/2003 | Morioka et al. | 369/30.85 |
| 2005/0144627 A1* | 6/2005 | Kim et al. | 720/614 |
| 2005/0144628 A1* | 6/2005 | Cho et al. | 720/614 |

FOREIGN PATENT DOCUMENTS

| | | |
|---|---|---|
| JP | 2000-105985 | 4/2000 |
| JP | 2002-243015 | 8/2002 |

* cited by examiner

Fig. 2(a)
Fig. 2(b)
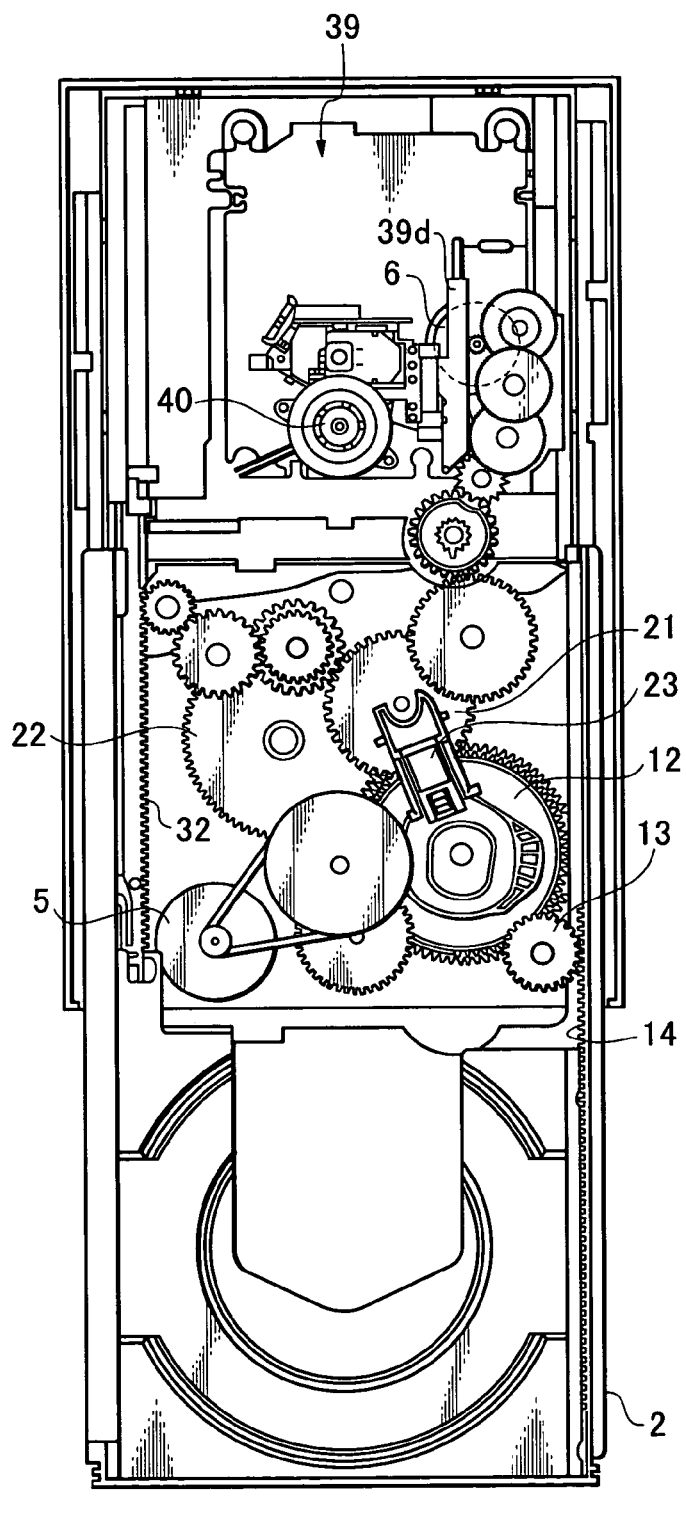
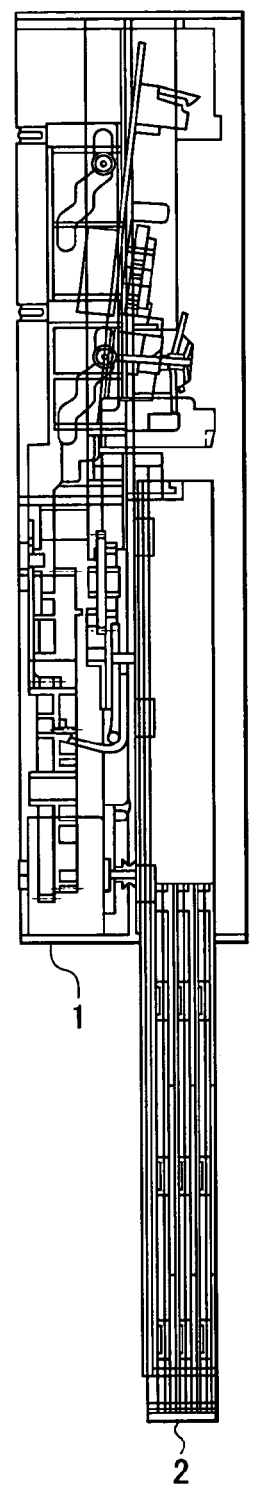

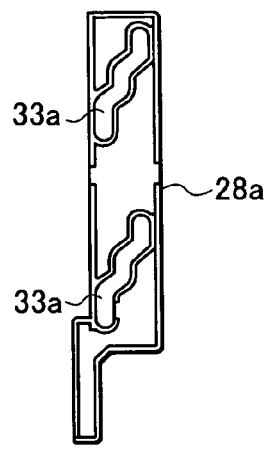
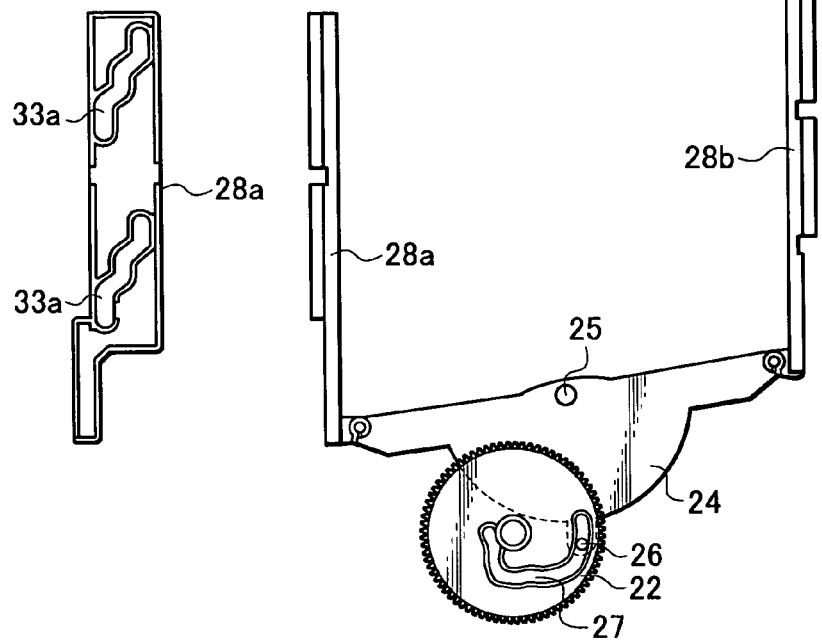
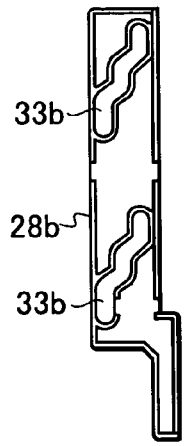
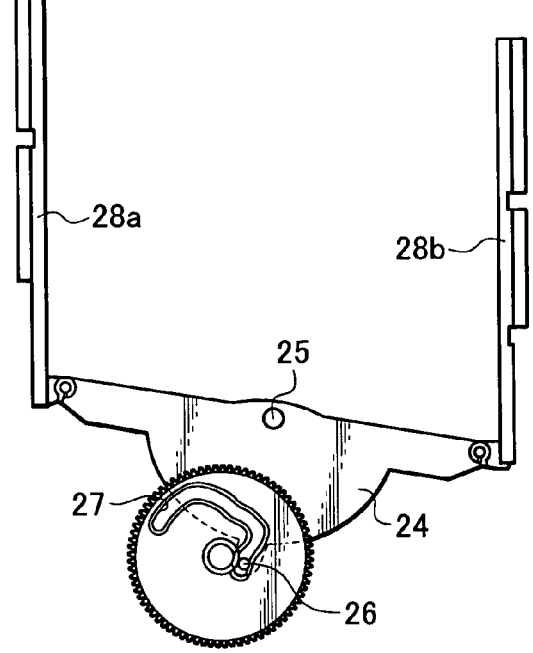

Fig. 14(a)
Fig. 14(b)
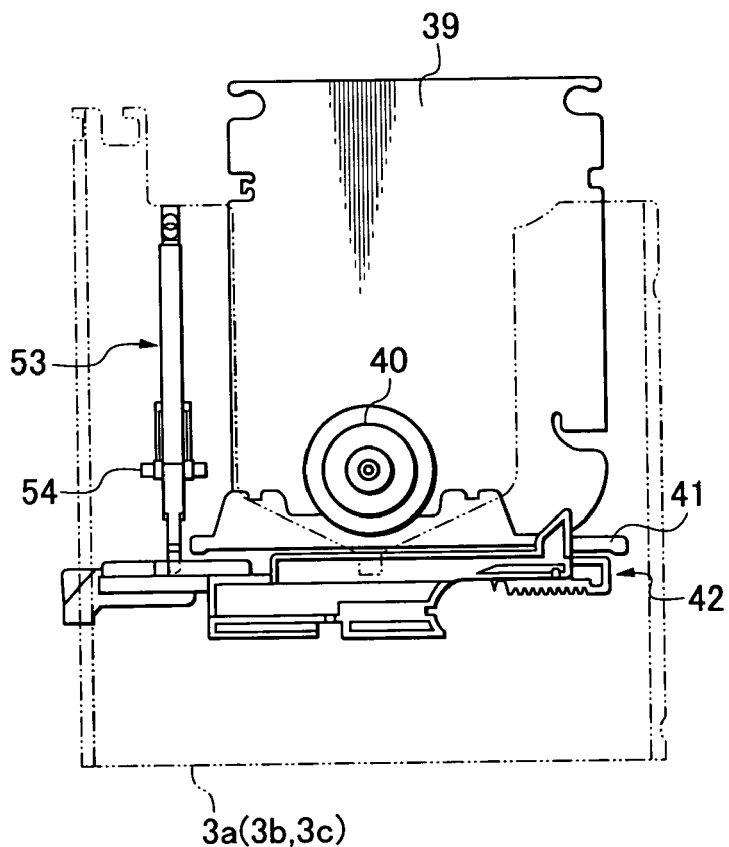
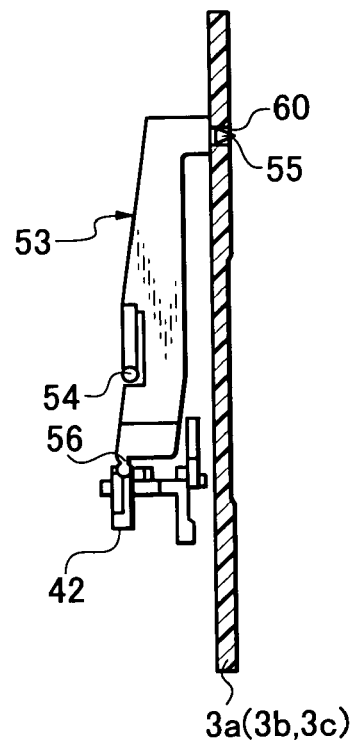
Fig. 14(c)
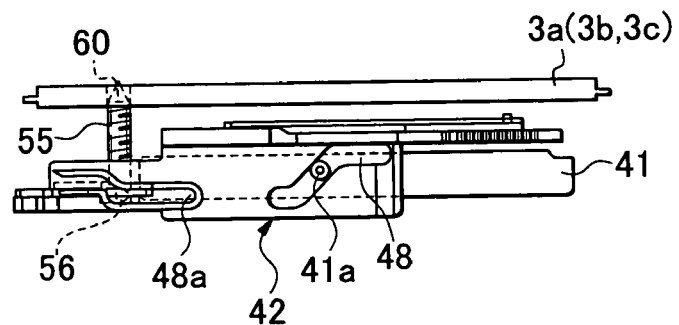

DISC DEVICE WITH DISC CHANGER

BACKGROUND OF THE INVENTION

1. Field of the Invention

The present invention relates to a disc device with a disc changer that accommodates a number of optical-disc storage media such as CD or DVD and automatically performs recording or playback of selected one storage medium, especially the disc device being a tray-type disc device with a disc changer having a number of trays that carries the storage media thereon and conveys the media.

2. Related Art

It is necessary in such disc device with the disc changer to accommodate a number of discs and select them for recording and playback, in addition, exchange the selected disc, therefore excessive, many operations including selection, positioning, and conveyance of a sub-tray, selection of a disc, and power switching are necessary, and necessarily additional motors are required as driving sources. On the other hand, a power switching mechanism, in which each operation may be selected and performed smoothly and accurately, is necessary for achieving a structure having a limited number of motors.

For example, "Mechanism for Switching Rotation Transmission" according to JP-A-2002-243015 is configured to perform an ejection operation (operation of conveying to a disc exchange position) of a carriage (sub-tray) and a play operation (operation of conveying to a disc playback position) using a single motor, and switch a driving force channel using a plunger. That is, a configuration is described, in which "a plunger having a lever that moves a rotation gear to a rotation axis direction; a carriage installed in piles such that the ejection operation or the play operation is enabled when either one is selected; a unit for driving the ejection operation and play operation; an motion switching unit for switching motion transmission to a side where either one of the ejection operation and the play operation is selected; and a motion transmission unit for performing the ejection operation or the play operation are provided, and either one of a first gear and a second gear is connected to a motion switching system and the other is connected to a motion transmission system, and a rotation position of the rotation gear is switched so that the rotation gear is detachably fitted to engage with either one of the first gear or the second gear".

However, in this configuration, noise occurs for each switching by using the plunger, component price becomes high due to the plunger, and power consumption increases, causing heat generation and fire. Moreover, electric wiring and circuit board increase, and the device is necessarily scaled up, therefore there is fear that a magnetic field generated from the plunger has an effect on other components.

"Disc Playback Device with Disc Changer" according to JP-A-10-134474, in which a disc tray transfer operation for disc exchange and a disc tray transfer operation for disc loading are carried out using one motor as a driving source to simplify a mechanism for switching power transmission, is described to have a configuration in which "a first transfer unit that transfers a disc tray horizontally between a disc storage position and a position outside the device, and a second transfer unit that transfers the disc tray between the disc storage position and a playback position are selectively driven by a first driving unit, and a target of power transmission of the first driving unit is determined according to a rotation direction in an initial stage of the first driving unit".

However, in addition to the conveyance operation of the tray, the motor is required for each of operations of lifting and lowering a traverse unit and driving a pickup, therefore three motors in total are used for the configuration. Thus, the production cost of the disc device with the disc changer increases by just that much, and size is also increased.

In "Disc Player" according to JP-A-2000-105985, a disc player is disclosed, in which a clamp release operation is smoothly performed, and after releasing the clamp, the operation is promptly shifted to a disc conveyance operation. That is, a disc conveyance unit that conveys a disc to the playback position by moving a tray on which the disc is removably mounted, a clamper, a turntable that clamps the disc together with the clamper, a pickup unit, a base that supports the turntable and the pickup unit, and a playback unit including a lifting-and-lowering unit that lifts and lowers the base to move the turntable between a clamping position and an unclamping position are provided; and a protrusion for positioning the tray, which fits into a hole formed in a recess in the tray when the turntable is moved to the clamping position, is provided on the base.

In the device, at the same time when the disc is clamped, positioning of the tray carrying the disc thereon, the pickup unit, and the base moving up and down with supporting the turntable is performed. Accordingly, relative positions among the pickup unit, turntable, and the tray are not displaced during playback, and the clamp release operation after the playback can be smoothly performed without a particular obstacle. Then, at the same time when the clamp release operation of the disc is performed, positioning of the tray is released, and after releasing the clamp, the operation can be promptly shifted to the disc conveyance operation. Thus, operations as the disc player can be promptly performed.

However, when the tray is positioned, temporal delay occurs before the protrusion fits into the hole in the tray located on an upper side of a base member, and the positioning of the tray is performed after the disc is clamped. Therefore, displacement occurs between the disc to be clamped and the turntable. On the contrary, when the clamp is released, since the base member is lowered and the protrusion is disengaged from the hole in the tray and then the clamp is released, in some cases, the disc to be returned is incorrectly carried on the tray.

In this way, the conventional disc device with the disc changer has problems as the above. The invention, which intends to solve issues that are these problems, aims to provide a disc device with a disc changer in which the number of motors is decreased by switching the power channel, and a quiet and stable switching operation without using the plunger is possible, in addition, accurate positioning of the sub-tray and smooth clamp and release of the disc are possible, and the production cost is reduced.

SUMMARY OF THE INVENTION

A disc device with a disc changer according to the invention has a configuration where a sub-tray to carry a disc thereon, a main tray to hold a number of sub-trays in an arranged condition, a first motor to drive the main tray and a second motor to drive the sub-tray, a main-tray conveyance unit to horizontally move the main tray between a disc exchange position and a disc waiting position, a sub-tray conveyance unit to horizontally move the sub-tray between the disc waiting position and a disc playback position, a traverse-unit moving unit to select a sub-tray carrying a disc to be played thereon and vertically move a traverse unit to a position of the sub-tray, a disc playback unit to clamp and play the disc on the sub-tray located in the disc playback position, and a gear switching mechanism to connect or disconnect driving channels of the first motor and the second motor are provided, wherein the gear switching mechanism comprises a first cam gear having first and second cam grooves formed therein and is rotationally driven by the first motor, a clutch lever installed in a back-and-forth swingable manner around a pivot fixed to a body frame and having a back edge slidably fitted into the first cam groove of the first cam gear, a second cam gear having a cam groove formed therein and being connected to the traverse-unit moving unit through the cam groove, and a clutch gear pivotally supported by a front edge of the clutch lever and capable of switching of connection to a channel including a transmission gear engaging with a sub-tray rack for conveying the sub-tray to the playback position, or to a channel including the second cam gear and transmission gears connected to the second motor, whereby the traverse-unit moving unit, the sub-tray conveyance unit, and the disc playback unit are selectively driven through the gear switching mechanism only by the second motor. According to such configuration, the number of motors used for driving the disc device can be decreased to two, in addition, decreased in number of components and reduction in size and thickness of products are possible.

The traverse-unit moving unit may comprise a cam lever having a guide pin engaging with the cam groove of the second cam gear and swings with rotation of the second cam gear, and a pair of slider provided slidably along a respective guide in both sides of the body frame in parallel with each other, each slider being connected to each end of the cam lever and having a step-like cam groove, and the traverse unit engages with the cam groove so that the traverse unit can move vertically with sliding of the slider. Accordingly, vertical movement of the traverse unit becomes smooth.

The sub-tray conveyance unit may comprise a sub-tray rack to move vertically together with the traverse unit, the sub-tray rack having a traction portion standing thereon, a hook formed on top end of the traction portion; a latch piece formed on an end of the sub-tray with which the hook of the traction portion engages; a fitting hole formed with the latch piece through which the traction portion can be inserted; and an opening communicating with the fitting hole through which the traction portion without the hook can pass; whereby the hook of the traction portion engages with the latch piece with lifting-and-lowering movement of the sub-tray rack, and the sub-tray is conveyed with movement of the sub-tray rack with rotation of the rack conveyance gear.

A main gear may be mounted on a traverse frame and formed a missing teeth portion on an upper end thereof in such a manner that the main gear can engage with one of the transmission gears connected to the second motor and mounted on the traverse unit and the transmission gear engaged with the main gear is lifted with the traverse unit and positioned in the missing teeth portion of the main gear, thereby power transmission is broken, and thus the power transmission can be controlled timely and securely.

A rack loading may be provided as a lifting-and-lowering unit of a front-edge side of the traverse unit having a back-edge side pivotally attached to a traverse frame, which is movable right and left with respect to back-and-forth movement of the sub-tray, and has a guide groove into which a boss provided on a front edge of the traverse unit is freely fitted for guiding up-and-down moving in a predetermined height, a lead-in groove formed at one end side curving approximately at a right angle via a sloping portion into which a guide pin standing at a front edge side of the sub-tray rack advances when the sub-tray rack is conveyed to the disc playback position, and a rack tooth formed on the other end with which a small auxiliary gear provided coaxially on an upper face of the main gear engages; the auxiliary gear having a large tooth and the rack tooth having a latch tooth with which the large tooth engages, thereby allowing transmission of power at a constant timing.

To position the sub-tray at a predetermined position to prevent the sub-tray from moving when the sub-tray in the waiting position is conveyed to the playback position and mounted and clamped on a traverse and during playback, the rack loading may have a sub-tray lever to swing up and down with a shaft as a fulcrum in conjunction with the right-and-left movement of the rack loading for lifting and lowering the front edge side of the traverse unit; the sub-tray lever having an engaging pin jutting out on the front edge; and a positioning hole with which the engaging pin is fittingly engaged is formed in the sub-tray so that the sub-tray is positioned at a predetermined position to prevent the sub-tray from moving when the sub-tray in the waiting position is conveyed to the playback position to mount and clamp a disc on a turntable of the traverse and during playback. The lifting-and-lowering unit for the front edge side of the traverse unit can be a unit in which a cam groove to guide up-and-down moving in a predetermined height is formed in the rack loading, and a boss provided on a base of the sub-tray lever is freely fitted into the cam groove.

To prevent that another sub-tray located on an upper side of a predetermined sub-tray on which a disc to be replaced is set is carried out along with the main tray, it is enough to provide a selection lever installed in a back-and-forth swingable manner with a pivot fixed to the body frame and swingable with rotation of the first cam gear by fitting a back edge of the selection lever slidably into the second cam groove of the first cam gear; a sub-tray selector interlocking with the selection lever; a through-hole formed in a side portion of each sub-tray; the sub-tray selector being detachably engaged with the through-hole in the sub-tray, and another sub-tray located on an upper side of a predetermined sub-tray on which a disc to be exchanged is set, is locked so that the sub-tray is not carried out along with the main tray. It is possible that the sub-tray selector may have a downwardly bent front-edge and is installed in a back-and-forth swingable manner with a pivot fixed to the body frame; a selector to perform reciprocate sliding in conjunction with swinging of a front edge of the selection lever, is provided; the sub-tray selector interlocks with the selection lever via the selector; and the bent front-edge can be detachably engaged with the through-hole in the sub-tray. The interlocking unit of the selector with the selection lever can be made in a configuration that a hook is formed on a front edge of the selection lever, and the hook is engaged with a latch pin provided on the selector.

A ratchet may be mounted in a swingable manner closely to the selector, and the latch pin provided on the selector is engaged with a hook of the ratchet for positioning and stop operations, as a result more secure positioning can be achieved.

BRIEF DESCRIPTION OF THE DRAWING

FIG. 2(a) is a plan view showing an internal structure of the device, and FIG. 2(b) is a right side view of the structure;

FIG. 7(a) and FIG. 7(b) are plan views showing a lifting-and-lowering mechanism of a traverse unit in the device, and FIG. 7(c) and FIG. 7(d) are a left side view and a right side view of the mechanism respectively;

FIG. 14(a), FIG. 14(b), and FIG. 14(c) are a plan view, a right side view, and an elevation view showing a positioning condition in the device respectively;

and FIG. 18(a) to FIG. 18(f) is plan views showing respective modes of rotation of a first cam gear in the device.

DETAILED DESCRIPTION OF PREFERRED EMBODIMENT

Figure 1:
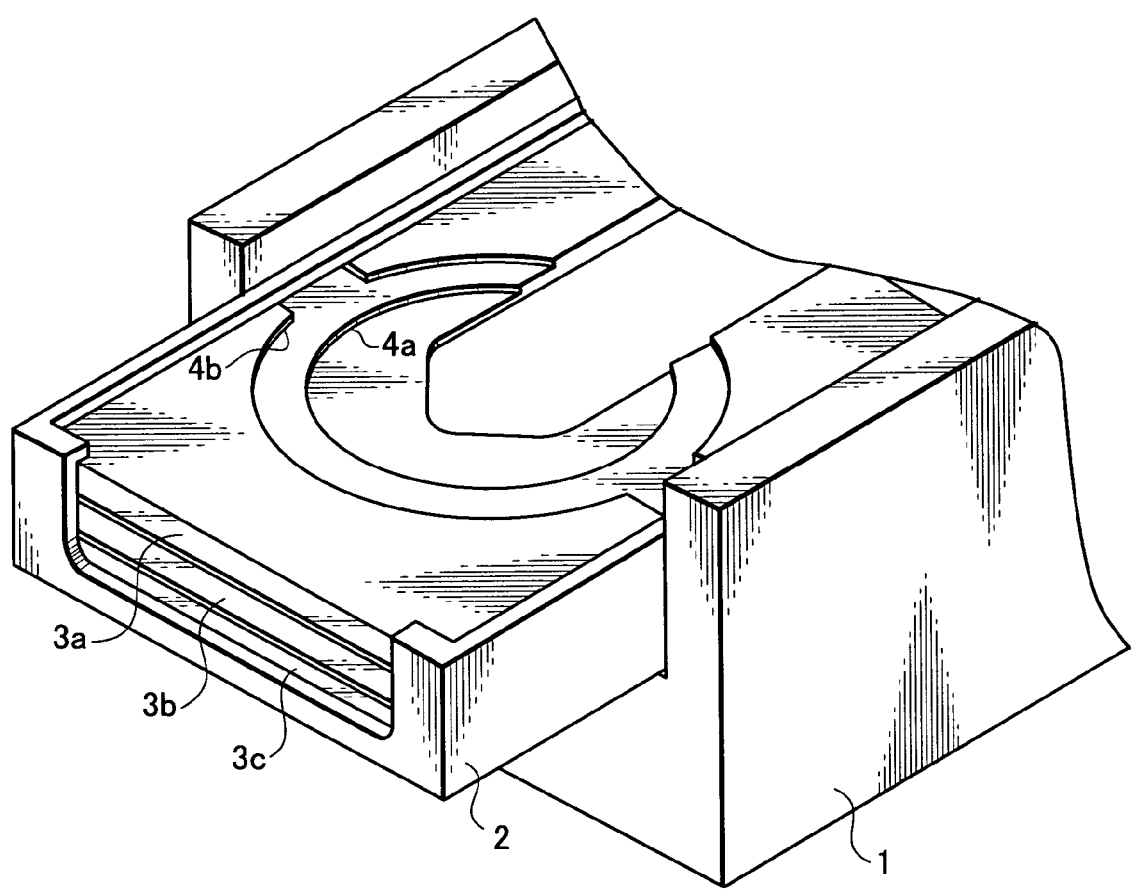
FIG. 1 is a perspective view partially showing an outside of a disc device with a disc changer according to the invention.

Hereinafter, an embodiment according to the invention is described in detail according to drawings. FIG. 1 shows a condition where the main tray is drawn out and located between the disc exchange position (disc removal position) and the disc waiting position. In the figure, numeral 1 shows a body frame, numeral 2 is a main tray, and numeral 3 shows sub-tray respectively, and three sub-trays 3a, 3b, and 3c are piled and accommodated in the main tray 2. In each of the sub-trays 3a, 3b, and 3c, concentric fringes 4a, 4b are formed with difference in level so that two discs, small and large may be carried on.

When a disc is carried on each of the sub-trays 3a, 3b, and 3c, or when the disc is removed, a sub-tray located at an upper side is locked and remained in the body frame 1, and the main tray 2 is conveyed to the disc exchange position together with a sub-tray located at a lower side. In this way, the sub-trays 3a, 3b, and 3c are accommodated in the main tray 2, and carried into and out of the body frame 1 together with the main tray 2.

At the disc exchange position, the disc can be always carried on a sub-tray located at a top level in the drawn-out sub-trays. After the disc is carried on, the main tray 2 is retracted from the disc exchange position and accommodated in the body frame 1, and then conveyed to the disc waiting position. When a disc carried on the sub-tray 3b at a middle level is exchanged, the sub-tray 3a at the upper level is locked to the body frame 1 and the sub-tray 3b at the middle level is drawn out to the exchange position in a condition that the middle level is top. When a disc carried on sub-tray 3c at a lower level is exchanged, the sub-tray 3a at the upper level and the sub-tray 3b at the middle level are locked and only the sub-tray 3c at the lower level is conveyed to the disc exchange position.

FIG. 2(a) and FIG. 2(b) show internal structures of the disc device with the disc changer. The figures, which show a condition that the main tray 2 is drawn out from the body frame 1, can be divided into three regions depending on a position of the disc. That is, the figures are divided into the disc exchange (removal) position, disc waiting position, and disc playback position from their front sides, and a place where the main tray 2 is retracted and accommodated in the body frame 1 in a condition that respective discs are set on the sub-trays 3a, 3b, and 3c is the disc waiting position. Among the discs at the disc waiting position, selected one is conveyed to the rear disc playback position together with the sub-tray, and then mounted on a turntable 40 in a traverse unit 39, and then subjected to recording and playback. The traverse unit 39 moves a vertical distance corresponding to a height of the sub-tray conveyed to the playback position, thereby the disc on the selected, predetermined sub-tray can be mounted on the turntable in the unit, as described later.

Figure 3:
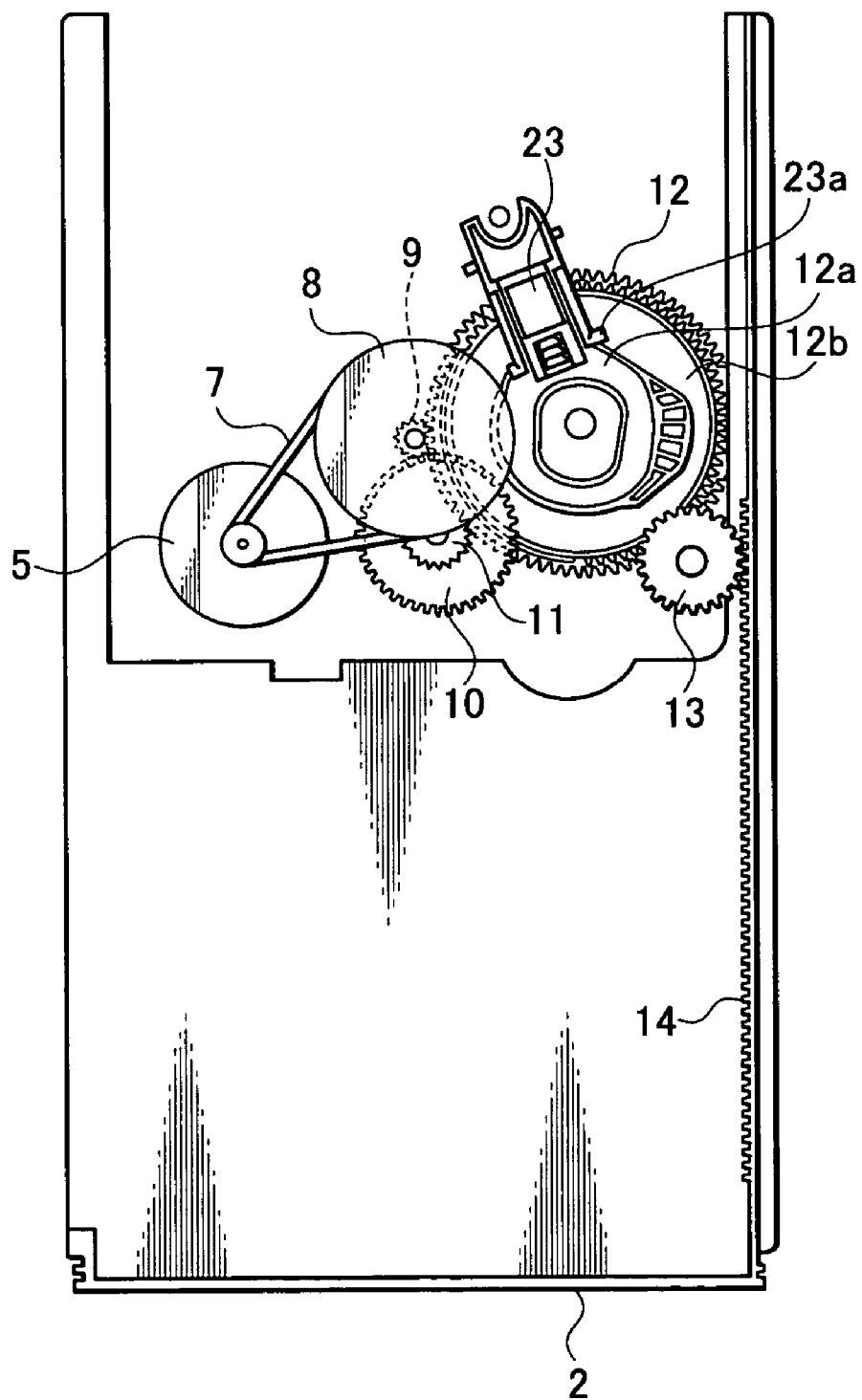
FIG. 3 is a plan view showing a driving channel of a first motor in the device.
Figure 4:
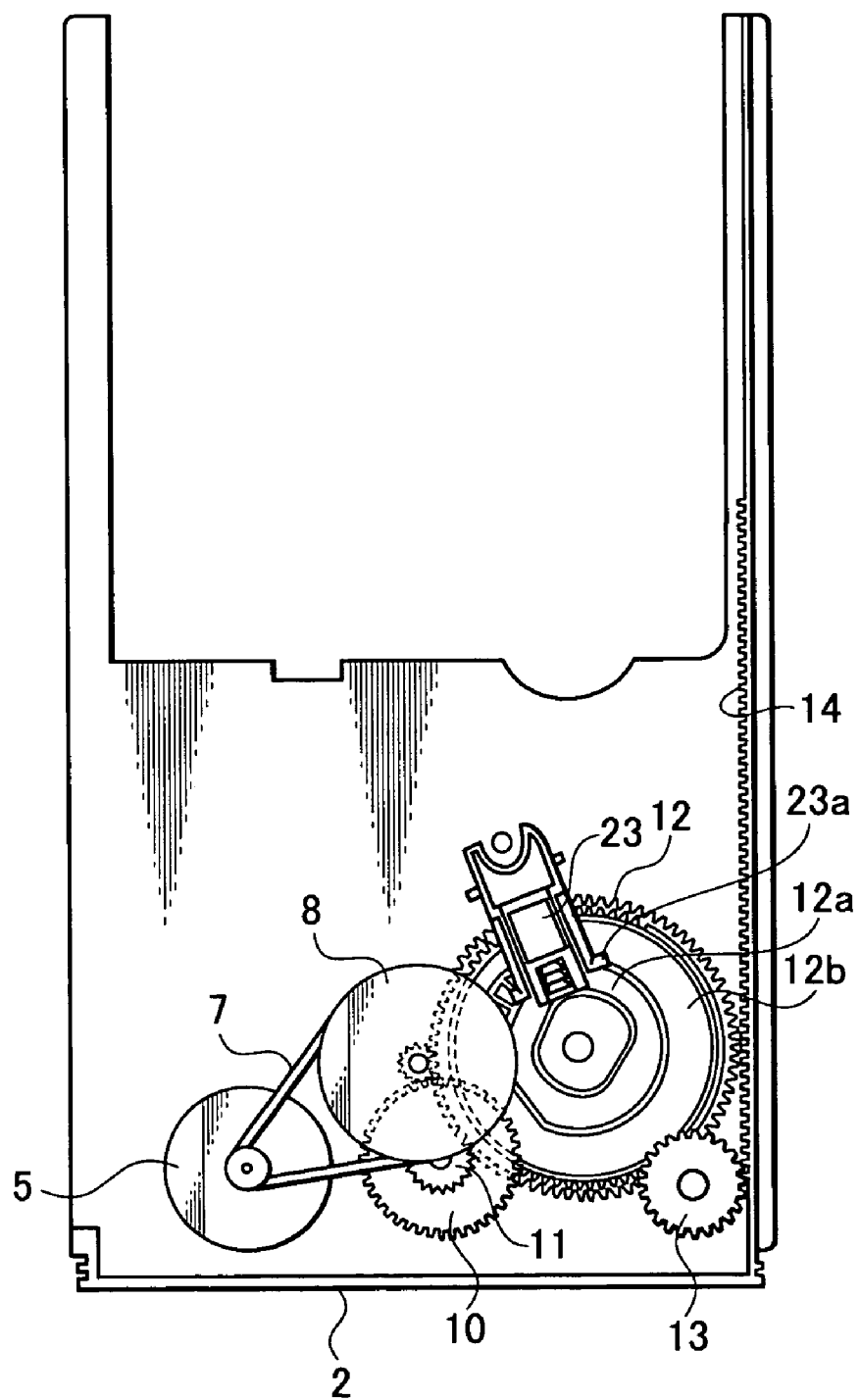
FIG. 4 is a plan view showing a condition of conveying a main tray using the first motor in the device.

In the disc device with the disc changer of the invention, two motors, a first motor 5 and a second motor 6 are provided, and all driving operations may be performed by the two motors. FIG. 3 shows a driving channel of the first motor 5, where the main tray 2 is open. Rotation power of the first motor 5 is transmitted to a pulley 8 through a belt 7, and then from a small gear 9 concentrically attached to the pulley 8 to a gear 10, and then to a first cam gear 12 through a gear 11 concentric with the gear 10, and then transmitted from the first cam gear 12 to a rack conveyance gear 13. The rack conveyance gear 13 engages with a rack 14 provided on a side edge of the main tray 2, therefore, when the first motor 5 rotates for driving, the main tray 2 slides and is conveyed into the body frame 1. FIG. 4 shows a condition that the main tray 2 is retracted and stored into the body frame 1.

Figure 5:
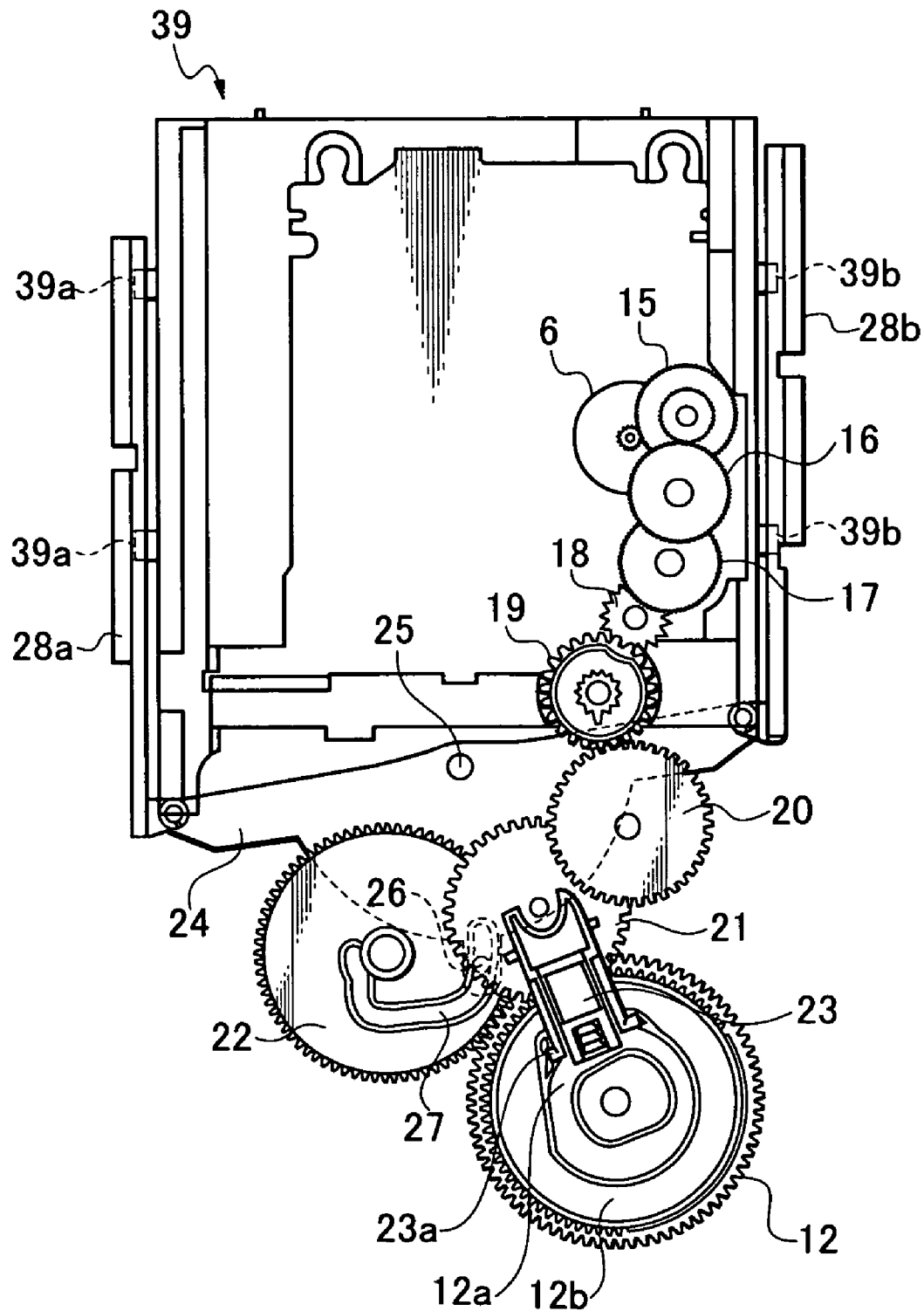
FIG. 5 is a plan view showing a driving channel of a second motor in the device.
Figure 6A:
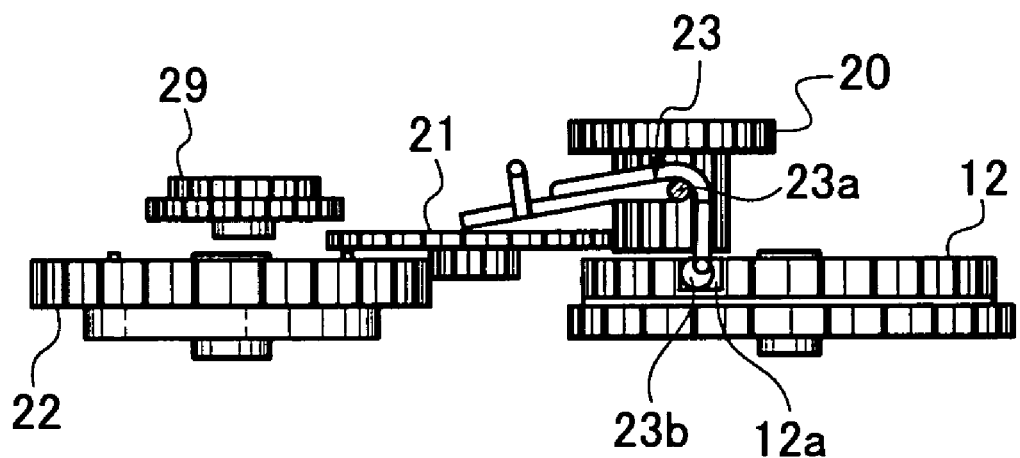
FIG. 6(a) and FIG. 6(b) are side views showing a switching operation of a clutch lever in the device.
Figure 6B:
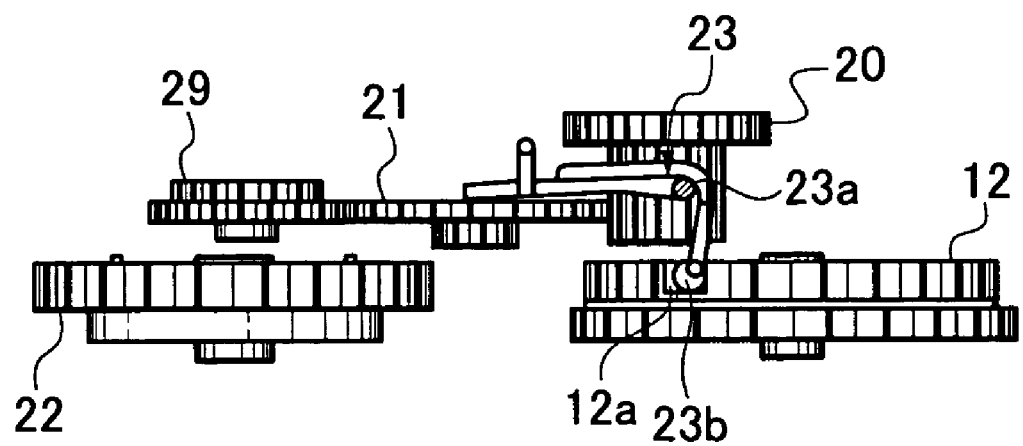

FIG. 5 shows a driving channel of the second motor 6, and rotation power of the second motor 6 is transmitted to a second cam gear 22 through gears 15, 16, 17, and 18, a main gear 19, a gear 20, and a clutch gear 21. Here, the clutch gear 21 is pivotally supported by a front edge of a clutch lever 23, and acts to connect and disconnect between the gear 20 and the first cam gear 12. That is, the clutch lever 23 is installed in a freely back-and-forth swingable manner with a pivot 23a fixed to the body frame 1, and has a back edge 23b fitted slidably into the first cam groove 12a in the first cam gear 12, and when the first motor 5 rotationally drives the first cam gear 12, the back edge 23b of the clutch lever 23 is pushed by a wall of the first cam groove 12a, thereby the clutch gear 21 is moved up and down, and at a lowered position, the clutch gear 21 engages with the second cam gear 22 (refer to FIGS. 6(*a*) and 6(*b*)).

A cam groove 27 is formed on the second cam gear 22, and a guide pin 26 jutted out on a central front-edge of a cam lever 24 formed in a schematically semicircular shape, which is installed in a freely, right-and-left swingable manner with a shaft 25 fixed to the body frame 1, is fitted into the cam groove 27. When the second cam gear 22 rotates and the guide pin 26 moves along the cam groove 27, the cam lever 24 swings right and left around the shaft 25. Sliders 28*a*, 28*b* are arranged in parallel and slidably along each guide (not shown) at both sides of the body frame 1. The sliders 28*a*, 28*b* are pivotally fitted to right and left ends of the cam lever 24. Step-like cam grooves 33*a*, 33*a*, 33*b*, and 33*b* are formed respectively in the sliders 28*a*, 28*b* (refer to FIGS. 7(*c*) and 7(*d*)), and guide pins 39*a*, 39*a*, 39*b*, and 39*b* protruded on both sides of the traverse unit 39 are slidably fit into the cam grooves 33, 33, 33*b*, and 33*b* respectively (refer to FIG. 5). The cam grooves 33*a* in the slider 28*a* and the cam groove 33*b* in the slider 28*b* are formed in a vertically symmetrical manner. That is, the cam grooves 33*a*, 33*b* are formed such that when a swinging angle of the cam lever 24 is a right angle to the sliders 28*a*, 28*b*, the guide pins 39*a*, 39*b* are located at respective middle levels of the cam grooves 33*a*, 33*b*, and when the slider 28*b* is pushed in a back side as FIG. 7(*a*), the guide pins 39*a*, 39*b* are located at respective upper levels of the cam grooves 33*a*, 33*b*, and on the contrary, when the slider 28*a* is pushed in a back side as FIG. 7(*b*), the guide pins 39*a*, 39*b* are located at. respective lower levels of the cam grooves 33*a*, 33*b*. Accordingly, when the sliders 28*a*, 28*b* slide back and forth according to swinging of the cam lever 24, the traverse unit 39 moves vertically with keeping a horizontal attitude.

Figure 8:
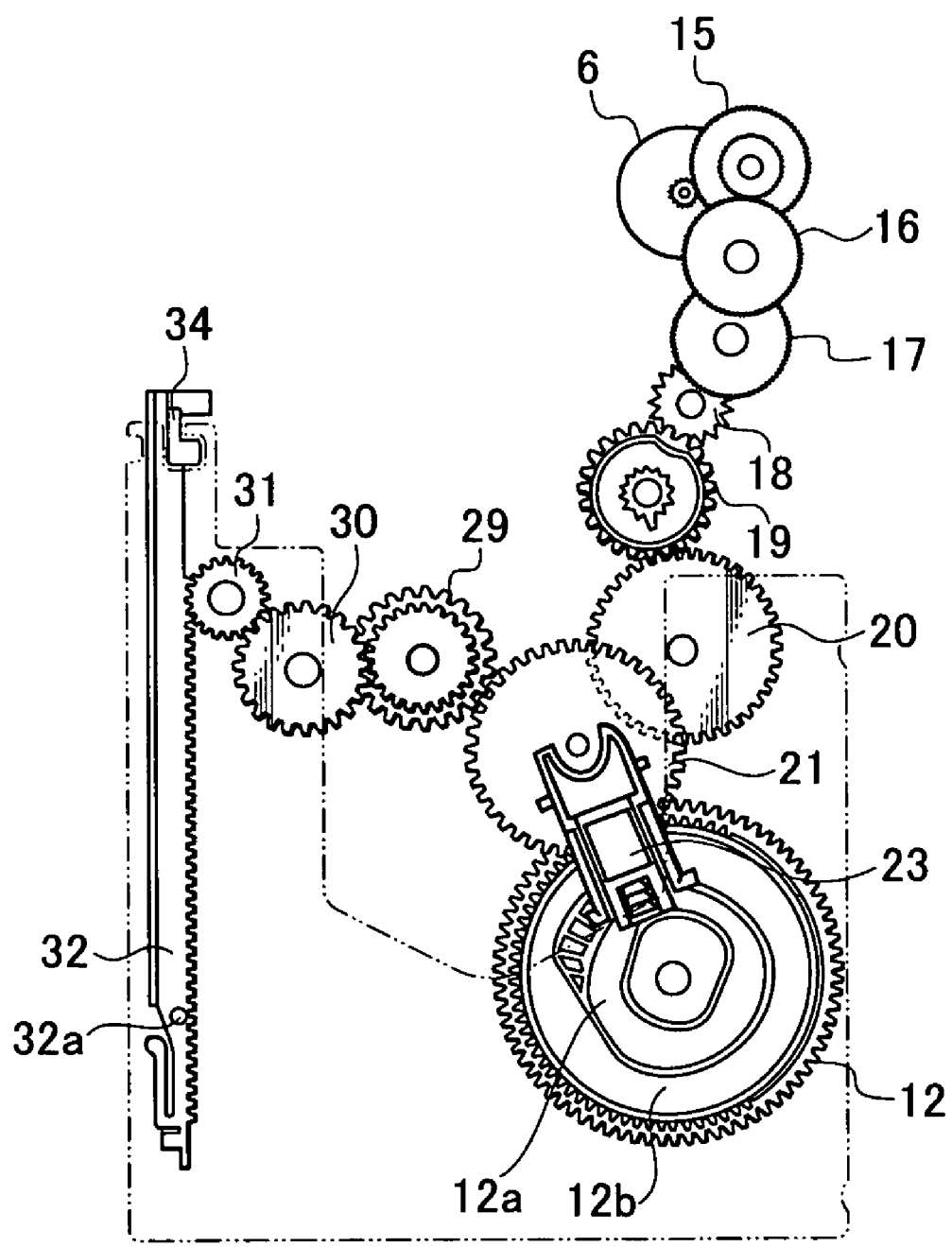
FIG. 8 is a plan view showing a conveyance mechanism of a sub-tray using the second motor in the device.

FIG. 8 shows a driving channel in the case that the clutch gear 21 pivotally supported by the front edge of the clutch lever 23 is lifted and located at a top. Here, the clutch gear 21 engages with a gear 29, and the gear 29 is connected to a rack conveyance gear 31 by engaging with a gear 30. The rack conveyance gear 31 engages with a sub-tray rack 32, and when the rack conveyance gear 31 is rotated by the second motor 6, the sub-trays 3*a*, 3*b*, or 3*c* in the waiting position is conveyed to the back and moved to the playback position.

Figure 9:
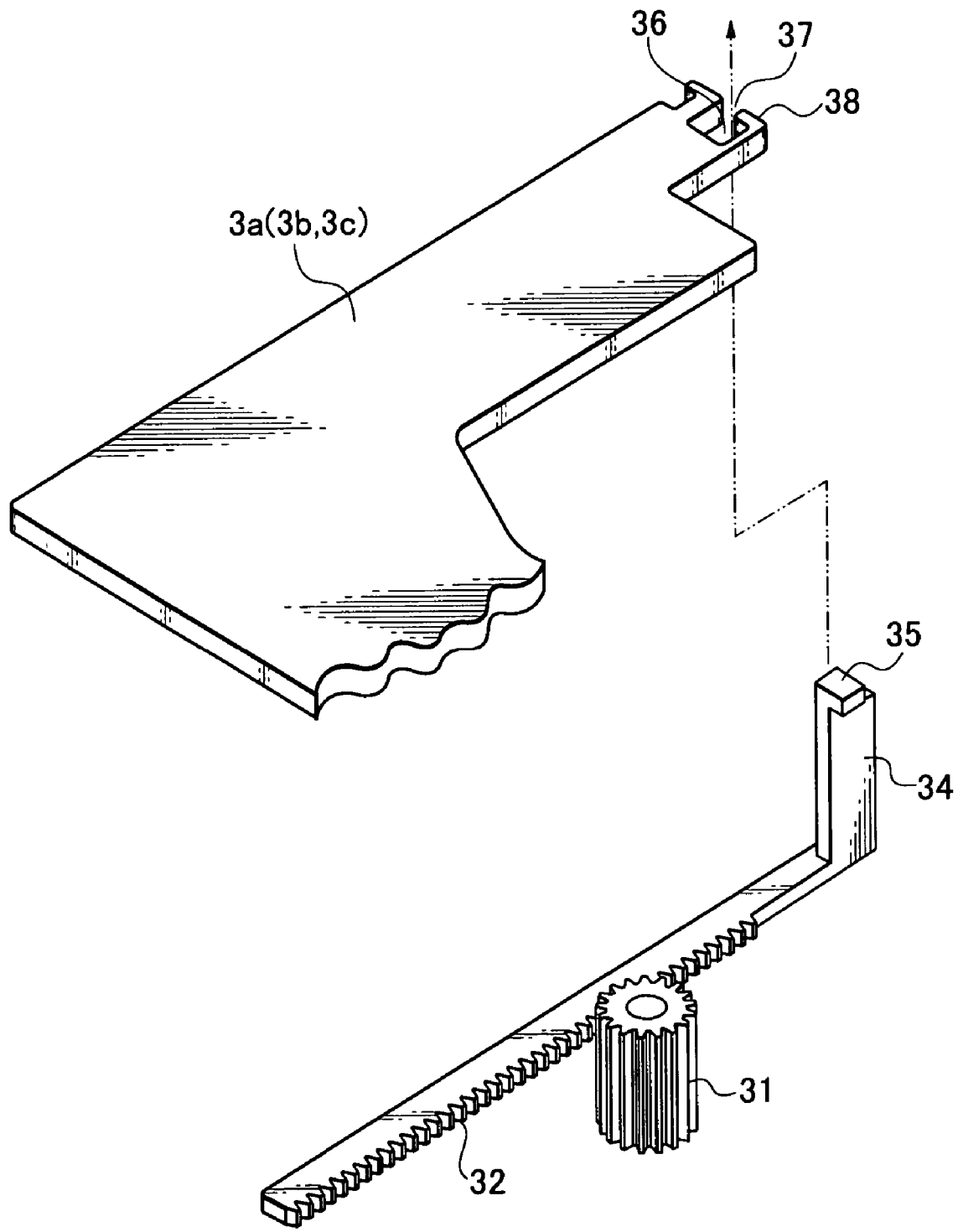
FIG. 9 is an exploded perspective view showing a relevant part of the conveyance mechanism of the sub-tray.

At the same time when the sub-tray rack 32 conveys the sub-trays 3*a*, 3*b*, or 3*c* to the playback position, the rack may move up and down in response to the up-and-down movement of the traverse unit 39. FIG. 9 shows a conveyance mechanism of the sub-tray 3 using the sub-tray rack 32. The sub-tray rack 32 engages with the rack conveyance gear 31, and has a traction portion 34 vertically stood on one end, and has a hook 35 formed on a front edge of the traction portion. On the other hand, at a corner of each of the sub-trays 3*a*, 3*b*, and 3*c*, a fitting hole 36 is formed such that the traction portion 34 can be vertically inserted through the hole, and a latch piece 38 with which the hook 35 is engaged is formed, and an opening 37 through which the traction portion without the hook 35 can pass is formed. Here, the sub-tray rack 32 is lifted, then the traction portion 34 is inserted through the fitting hole 36, and then the hook 35 at the front edge engages with the latch piece 38. When the rack conveyance gear 31 rotates and the sub-tray rack 32 is moved in this condition, the sub-tray 3*a*, 3*b*, or 3*c* is drawn by the traction portion 34 and conveyed to the playback position.

When the sub-tray 3*a* at the top level is conveyed, the sub-tray rack 32 is lifted along with the traverse unit 39, and the traction portion 34 is inserted through the fitting holes 36, 36 in the sub-trays 3*b* and 3*c* located at the lower side and arrives at the sub-tray 3*a*, and the hook 35 at the front edge engages with the latch piece 38 in the sub-tray 3*a*. When the rack conveyance gear 31 rotates and the sub-tray rack 32 is moved in this condition, only the sub-tray 3*a* at the upper level, engaging with the hook 35, is conveyed, and the sub-trays 3*b*, 3*c* located at the lower side, in which the traction portion 34 passes through the openings 37, 37 formed in the fitting holes 36, 36, are not conveyed and remained in the waiting position.

Figure 10A:
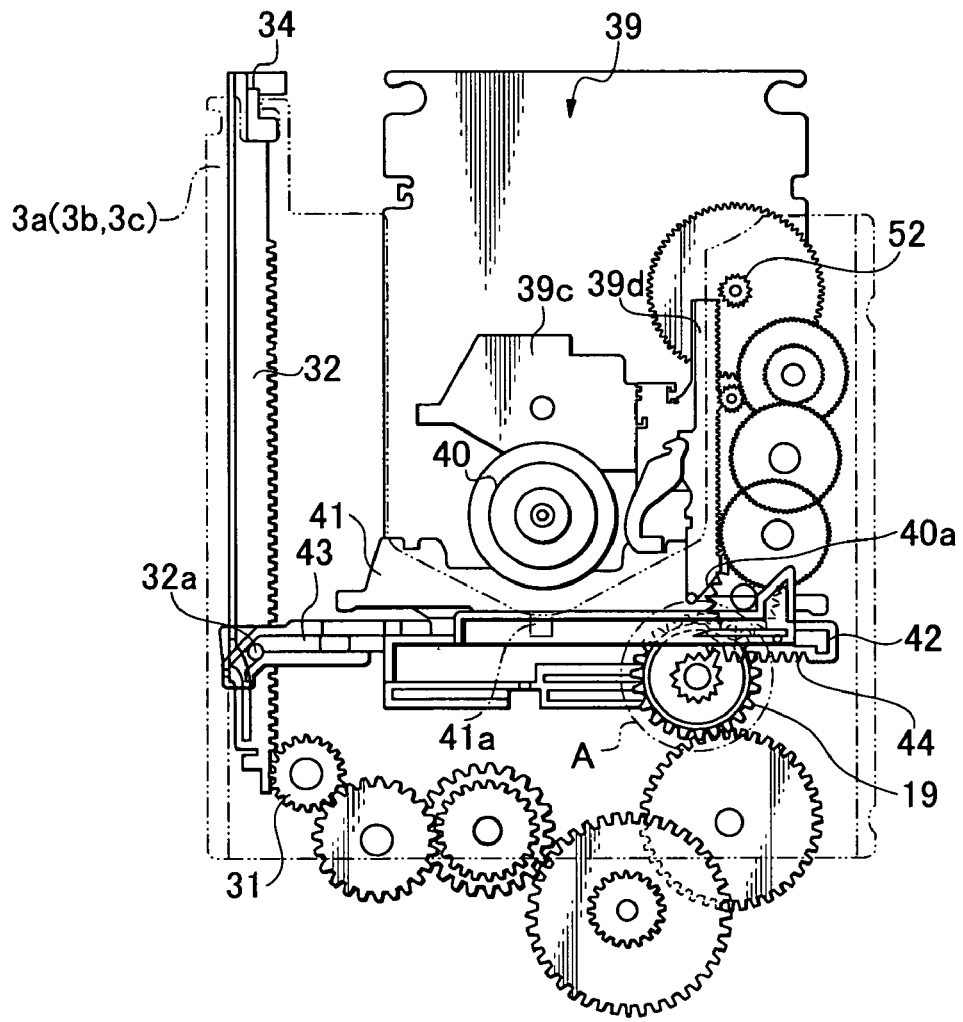
FIG. 10(a) is a plan view showing a driving mechanism of an optical pickup in the device.
Figure 10B:
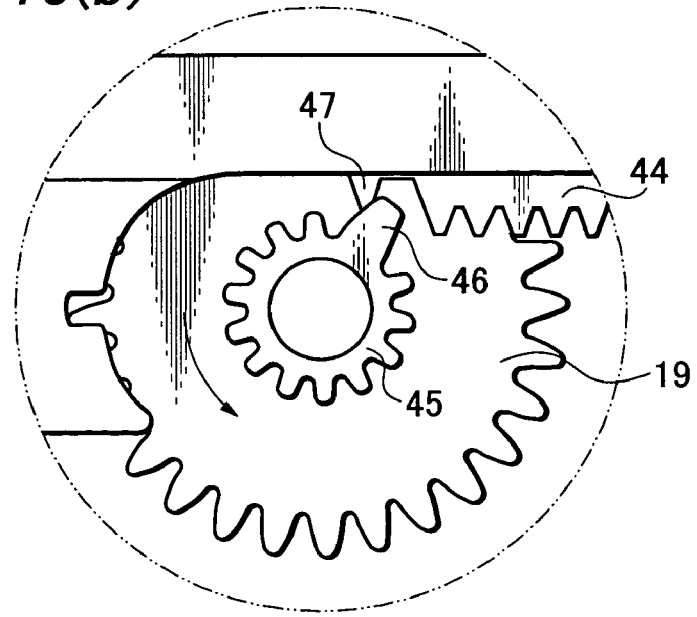
FIG. 10(b) is an expanded plan view of a portion "A" in FIG. 10(a)
Figure 11A:
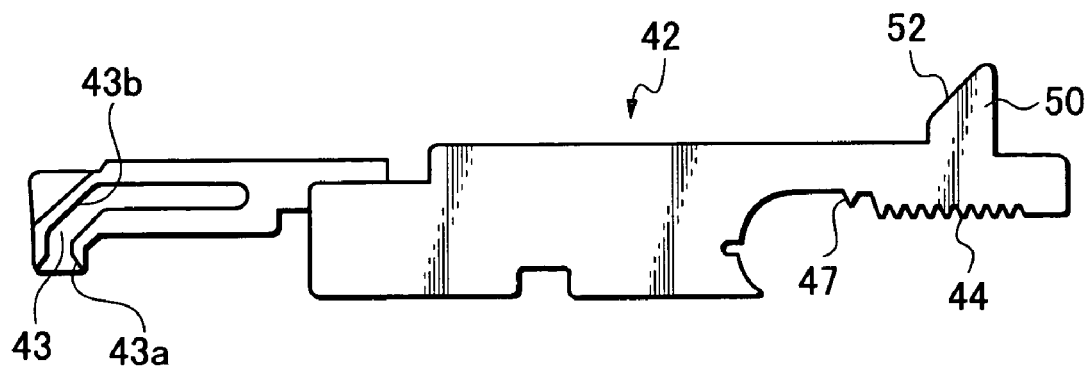
FIG. 11(a) and FIG. 11(b) are a plan view and an elevation view showing a rack loading in the device respectively.
Figure 11B:
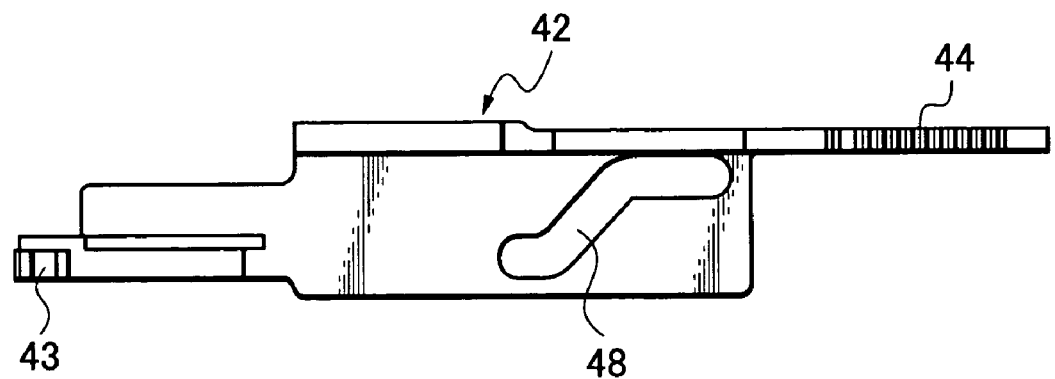

As shown in FIG. 10, on the body frame 1 adjacent to front of the traverse unit 39, as a lifting-and-lowering unit of the front edge side of the traverse unit 39 of which the back edge side is pivotally fitted to a traverse frame, a rack loading 42 is provided movably right and left with respect to the back-and-forth movement of the sub-tray A traverse holder 41 is attached to a front edge portion of the traverse unit 39, and a boss 41*a* protruded from the traverse holder 41 slidably fits into a step-like cam groove 48 formed in the rack loading 42. On one end side (left side in the figure) of the rack loading 42, a lead-in groove 43 is formed, into which a guide pin 32*a* standing at a front edge side of the sub-tray rack 32 advances. As shown in FIG. 11(*a*), the lead-in groove 43 is formed curvedly at a right angle from an opening 43*a*, which is opened to the forward direction of the sub-tray when it is conveyed to the disc playback position, via a slope portion 43*b*, and the guide pin 32*a* moves the rack loading 42 left as the guide pin 32*a* fits into the lead-in groove 43 and advances along the slope portion 43*b*.

Figure 12A:
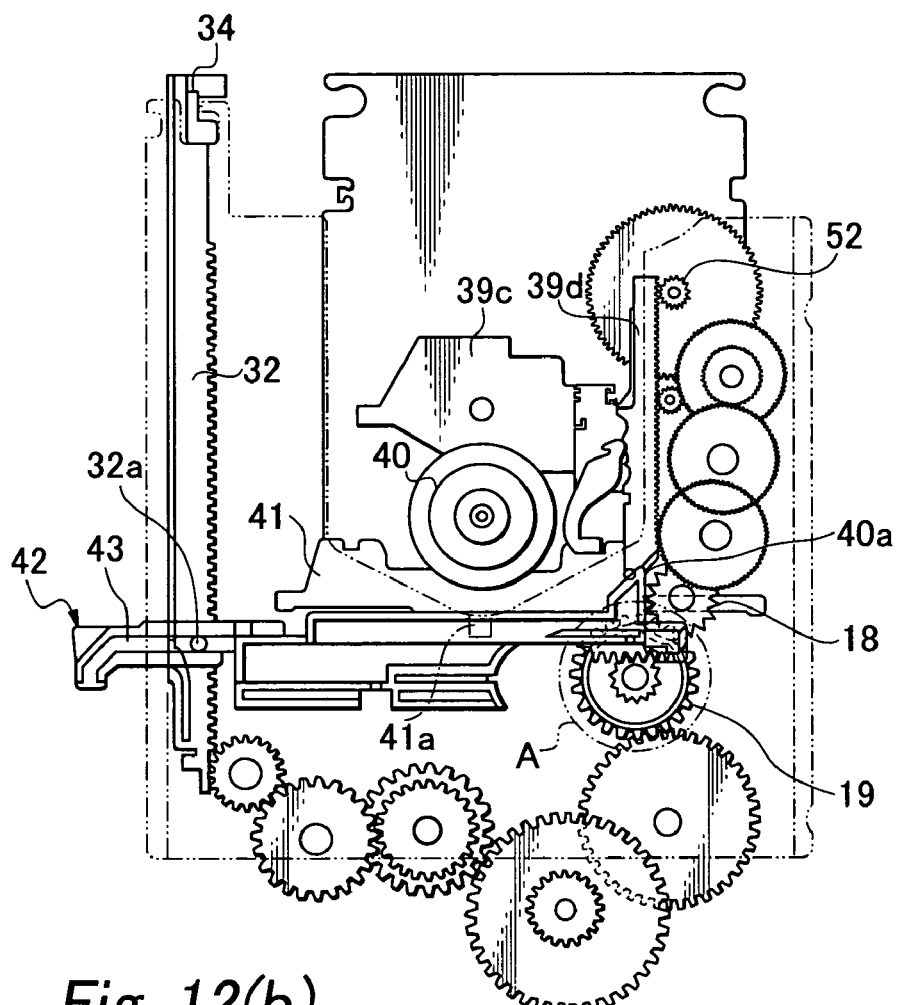
FIG. 12(a) is a plan view showing the driving mechanism of the optical pickup in the device.
Figure 12B:
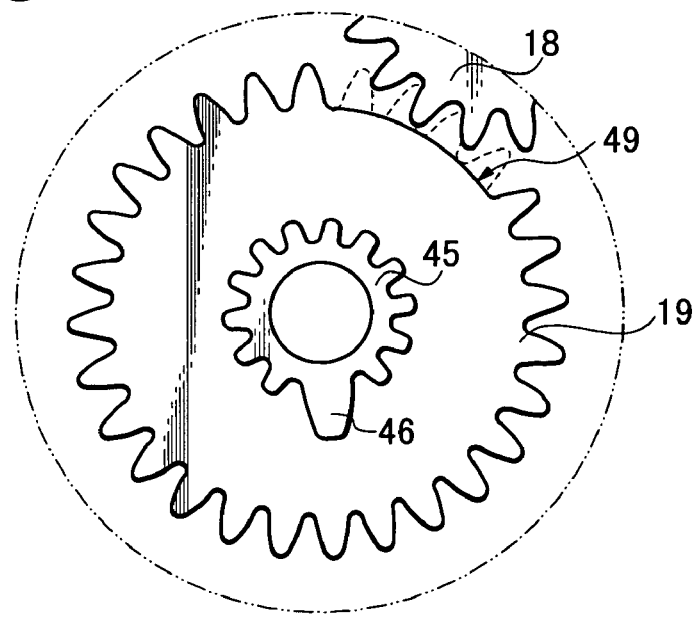
FIG. 12(b) is an expanded plan view of a portion "A" in FIG. 12(a)

As shown in FIG. 11(*a*), a rack tooth 44 is provided on the other end side (right side in the figure) of the rack loading 42, and a push-out portion 50 having a sloping face 51 is protuberantly provided on a backside of the rack tooth 44. A latch tooth 47 with which a large tooth of an auxiliary gear, described later, engages is formed at the left side of the rack tooth 44. On the other hand, the main gear 19 to engage with the gear 18 mounted on the traverse unit is mounted on the body frame, and has a large height. Further, the main gear 19 has a missing teeth portion 49 formed on the upper end portion (refer to FIG. 12(*b*)). A concentric, auxiliary gear 45 with a small diameter is provided on the upper end of the main gear 19. A large tooth 46 greatly protruded in an outward direction is provided on the auxiliary gear 45. As described above, when the guide pin 32*a* pushes the slope portion 43*b* of the lead-in groove 43 and moves the rack loading 42 left, the large tooth 46 of the auxiliary gear 45 engages with the latch tooth 47 provided on the end of the rack tooth 44 and rotates counterclockwise, thereby the auxiliary gear 45 can engage with the rack tooth 44 (refer to FIG. 10*a*) and further moves the rack loading 42 left. At that time, engagement between the sub-tray rack 32 and the rack conveyance gear 31 is released.

When the rack loading 42 is moved left in this way, the boss 41*a* jutted out on the traverse holder 41 moves up in the step-like cam groove 48 in the rack loading 42, and the front edge side of the traverse unit 39, which inclines in a way that a disc waiting side of the unit is lowered, moves up, and the disc conveyed to the playback position is mounted on the turntable 40. In addition, when the rack loading 42 moves left, the sloping face 51 of the push-out portion 50 contacts with a slope portion 40*a* on a front edge of a rack 39*d* attached to the traverse unit 39, and pushes the rack 39*d* to the back side, thereby that rack 39*d* engages with a rack driving gear 52, and thus an optical pickup 39*c* is started to be driven for playback of the disc (refer to FIG. 12(*a*)). On the other hand, when the gear 18 is lifted as the traverse unit 39 is lifted and arrives at the missing teeth portion 49 of the main gear 19, rotation of the gear 18 is not transmitted to the main gear 19, and the power is separated here.

Figure 13A:
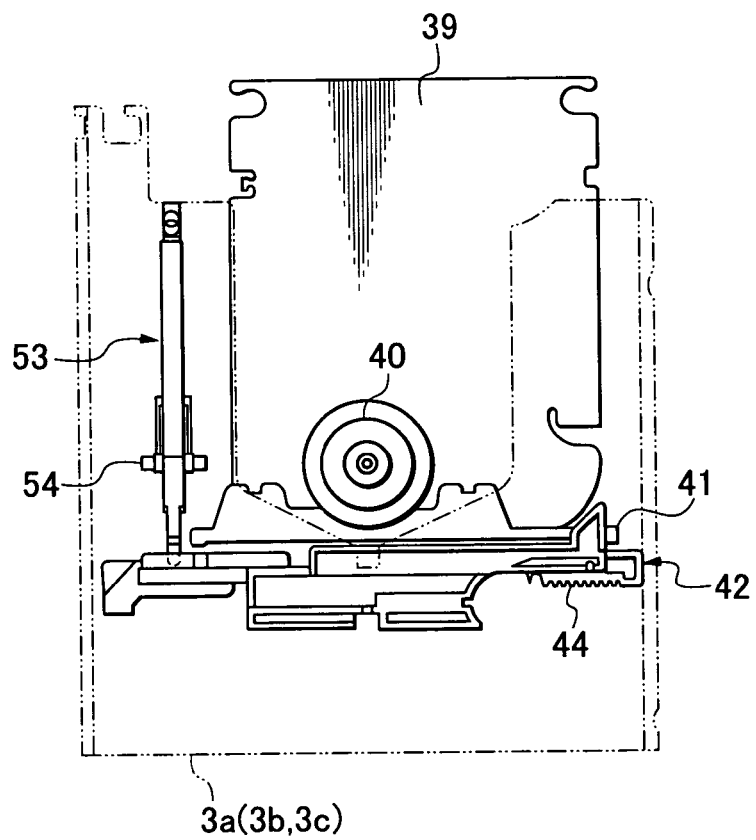
FIG. 13(a), FIG. 13(b), and FIG. 13(c) are a plan view, a right side view, and an elevation view showing a positioning mechanism in the device respectively.
Figure 13B:
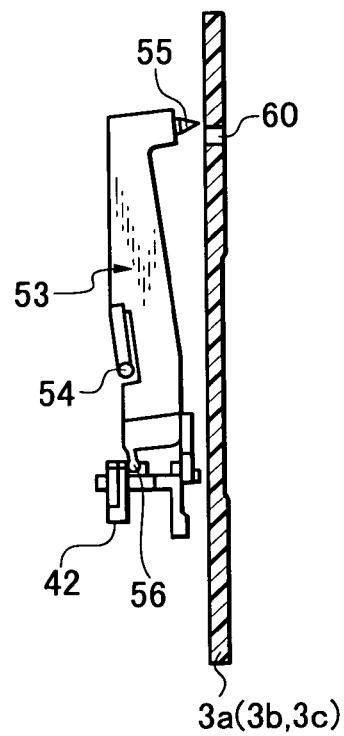
Figure 13C:
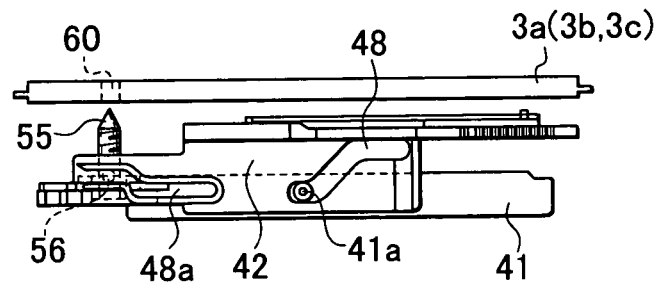

FIGS. 13(a), 13(b), and 13(c) show an example of a positioning mechanism of the sub-tray. The positioning of the sub-tray 3a, 3b, or 3c is performed by a sub-tray lever 53 provided in an up-and-down swingable manner with a shaft 54 pivotally fitted to the body frame 1. A vertically run-through positioning-hole 60 is formed in each sub-tray 3a, 3b, or 3c, and an engaging pin 55 protruded upward is provided on a front edge of the sub-tray lever 53 such that the pin can fit into the positioning hole 60. On the other hand, a step-like cam groove 48a having a small difference in level other than the cam groove 48 is provided in the rack loading 42, so that a boss 56 provided on a base of the sub-tray lever 53 slidably fits into the cam groove 48a, and when the lack loading 42 moves left, the engaging pin 55 on the front edge fits into the positioning hole 60. That is, when the lack loading 42 moves left, the boss 56 on the base of the sub-tray lever 53 moves from an upper portion to a lower portion of the cam groove 48a, thereby the engaging pin 55 on the front edge of the sub-tray lever 53 swings upward with the shaft 54 as a fulcrum and fits into the positioning hole 60. According to such configuration, the disc can be correctly mounted on the turntable 40 in a condition that the sub-tray 3a, 3b, or 3c, on which the disc is carried, is positioned in a predetermined position.

FIGS. 14(a), 14(b), 14(c) show a condition immediately after the engaging pin 55 fits into the positioning hole 60 in the sub-tray 3a, 3b, or 3c. The disc is not mounted yet on the turntable 40 immediately after the engaging pin 55 fits into the positioning hole 60 and the sub-tray 3 is positioned. That is, the boss 41a of the traverse holder 41 is in the intermediate sloping part of the cam groove 48, and the disc is mounted on the turntable 40 with further movement of the rack loading 42 to the left side. However, the cam groove 48a is formed horizontally within a moving distance of the boss 56 on the sub-tray lever 53 so that the engaging pin 55 is maintained in a fixed position even if the rack loading 42 further moves left.

Figure 15A:
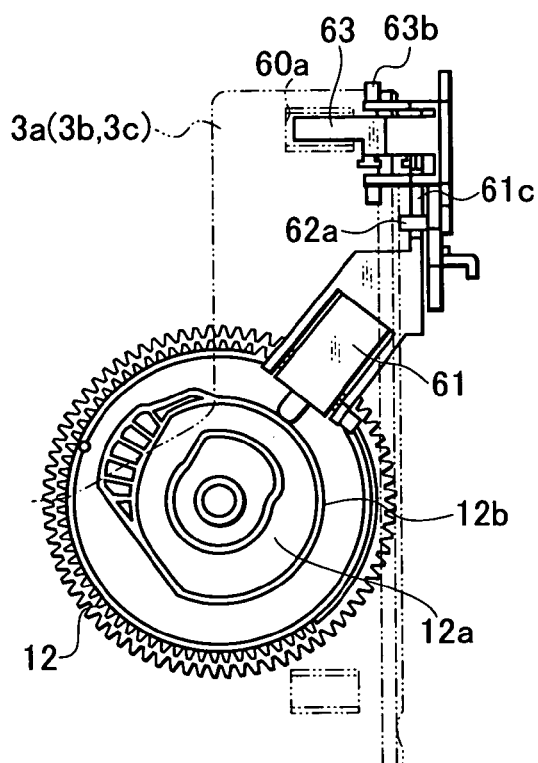
FIG. 15A, FIG. 15(b), and FIG. 15(c) are a plan view, a right side view, and an elevation view showing a disc selection mechanism in the device respectively.
Figure 15B:
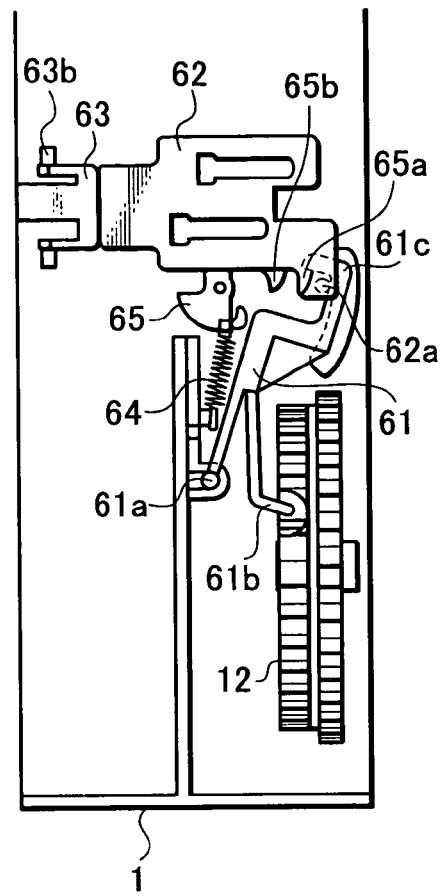
Figure 15C:
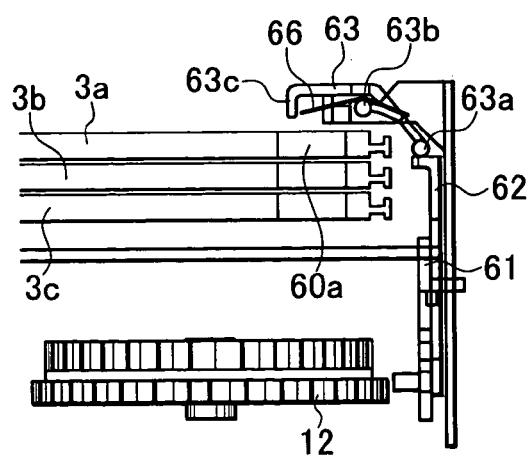

FIGS. 15(a), 15(b), and 15(c) show a disc selection mechanism in the disc device with the disc changer according to the invention. The disc selection mechanism comprises a selection lever 61 that swings with the rotation of the first cam gear, a selector 62 interlocking with the selection lever 61, and a sub-tray selector 63. In the selection lever 61, a shaft 61a is pivotally supported by a bearing provided in the body frame 1, and a back edge 61b of the lever is slidably fitted into a second cam groove 12b formed in the first cam gear 12. The second cam groove 12b is formed such that when the first cam gear 12 rotates, the selection lever 61 swings at a predetermined position around the shaft 61a of the selection lever 61. A hook 61c is provided at a front edge of the selection lever 61, and the hook 61c extends to the selector 62 provided outside the sub-tray 3a, 3b and 3c.

A latch pin 62a is provided in a corner of the selector 62, and the hook 61c extending from the selection lever 61 engages with the latch pin 62a. When the selection lever 61 swings and the hook 61c press the latch pin 62a, the selector 62 slides along with the latch pin 62a and press the end 63a of the sub-tray selector 63. The sub-tray selector 63 is pivotally supported by a shaft 63b in a swingable manner.

Although a front edge 63c of the sub-tray selector 63 bends downward, the front edge 63c of the sub-tray selector 63 shown in FIG. 15(c) does not fit into a hole 60a formed in a sub-tray 3a, 3b and 3c. A spring 66 is attached to the sub-tray selector 63 and biases the sub-tray selector in a direction disengaged from the hole 60a, and makes the edge 63a to always contact with a front edge of the selector 62.

Figure 16A:
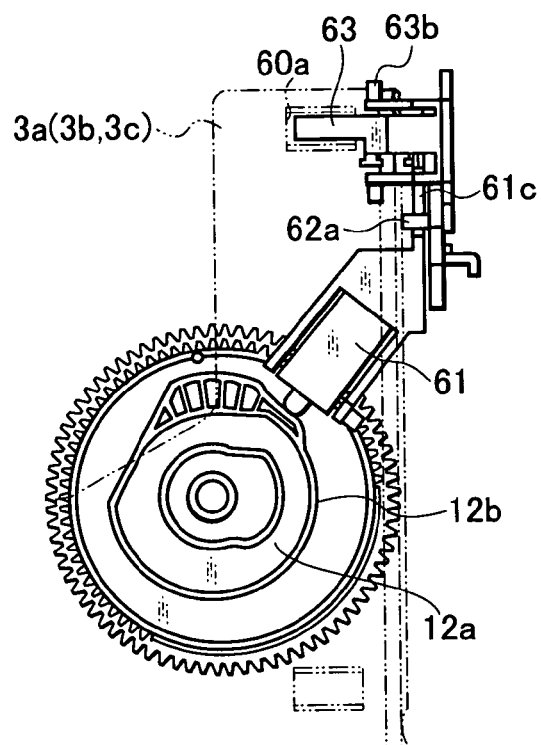
FIG. 16(a), FIG. 16(b), and FIG. 16(c) are a plan view, a right side view, and an elevation view showing a locking condition of a sub-tray at an upper level in the disc selection mechanism in the device respectively.
Figure 16B:
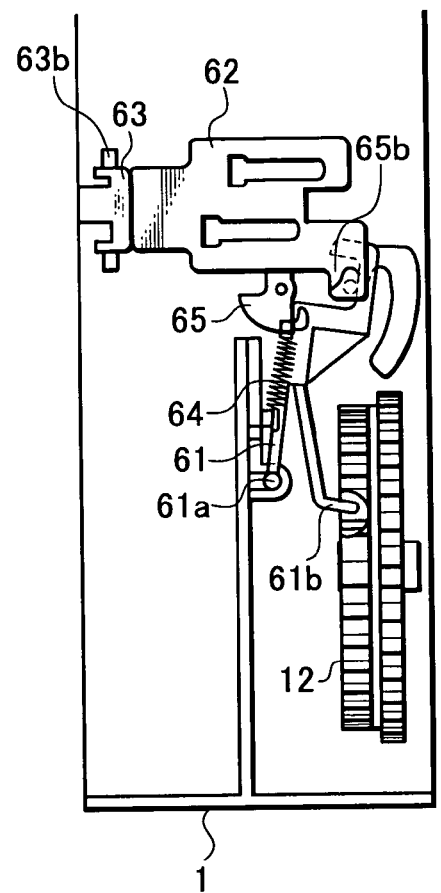
Figure 16C:
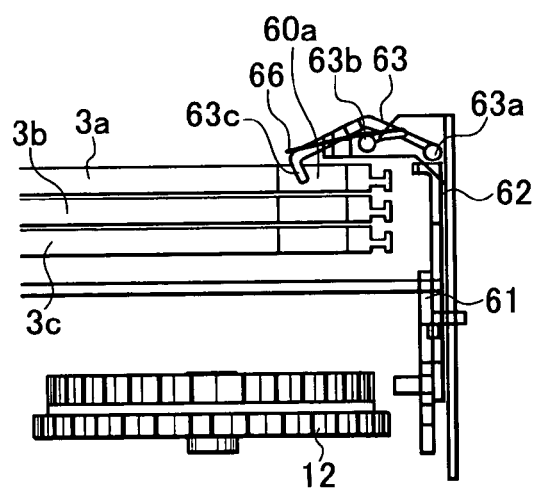

FIGS. 16(a), 16(b), and 16(c) show a condition that the front edge 63c of the sub-tray selector 63 fits into the hole 60a in the sub-tray 3a located at a top stage. When the first cam gear 12 rotates a predetermined angle and a back edge 61b is pushed against a bulged portion in a wall of the second cam groove 12b, the selection lever 61 rotates a predetermined angle and the hook 61c engages with the latch pin 62a and presses the pin, then the selector 62 slides and pushes up the end 63a of the sub-tray selector 63 and rotates around the shaft 63b, thereby the front edge 63c moves down and engages with the hole 60a. As a result, even if the main tray 2 is carried out, the sub-tray 3a is locked and remained in the waiting position.

Figure 17A:
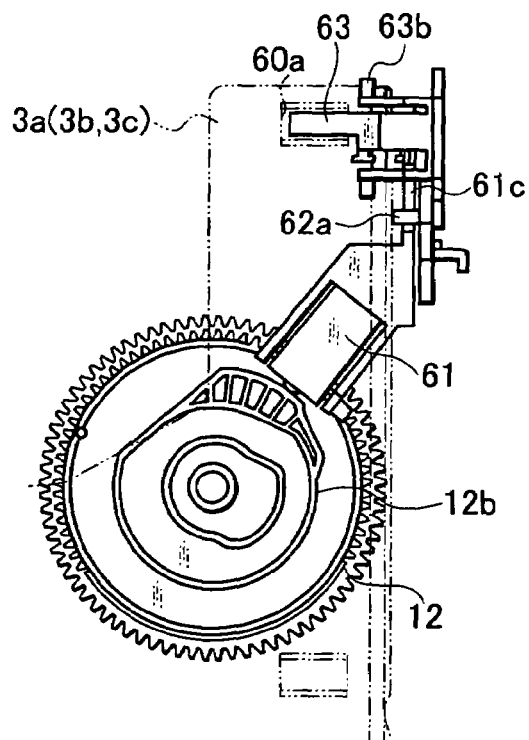
FIG. 17(a), FIG. 17(b), and FIG. 17(c) are a plan view, a right side view, and an elevation view showing a locking condition of sub-trays at upper and middle levels in the disc selection mechanism in the device respectively.
Figure 17B:
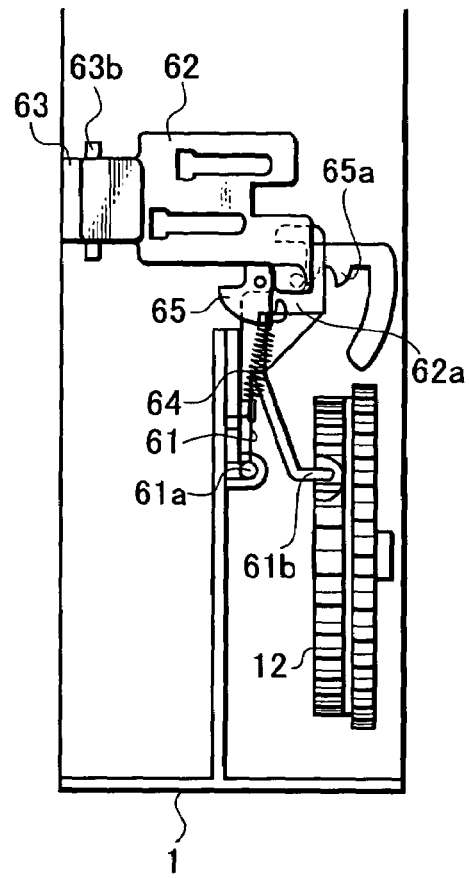
Figure 17C:
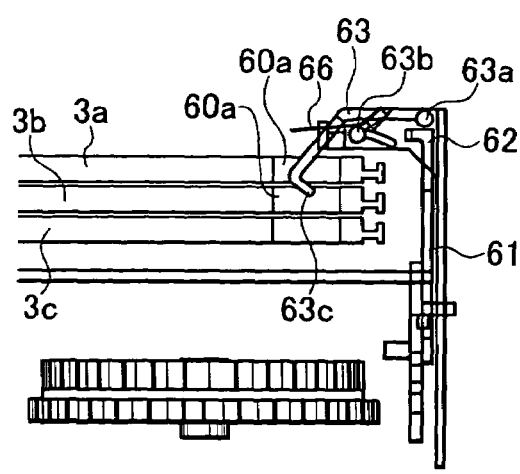

Similarly, FIGS. 17(a), 17(b), and 17(c) show a condition that the front edge 63c of the sub-tray selector 63 fits into respective holes 60a, 60a in the sub-trays 3a and 3b located at top and middle levels. When the first cam gear 12 further rotates and the back edge 61b is pushed against the maximum bulged portion in the wall of the second cam groove 12b, the selection lever 61 further rotates, the hook 61c presses the latch pin 62a to make the selector 62 slide, and further lowers the front edge 63c of the sub-tray selector 63 so that the edge 63c fits into the hole 60a in the sub-tray 3a and the hole 60a in the sub-tray 3b. Accordingly, the sub-trays 3a and 3b at the top and middle levels are locked and remained in the waiting position, and only the sub-tray 3c at the bottom level is carried out along with the main tray 2.

A ratchet 65 is attached swingably to the selector 62, and the latch pin 62a provided on the selector 62 is engaged with a hook 65a or 65b of the ratchet 65, thereby the selector 62 is securely positioned. The ratchet 65 is drawn by a spring 64 such that the latch pin 62a engaged with the hook 65a is not disengaged.

When the first cam gear 12 rotates a predetermined angle from a condition of FIG. 15(b) and the selection lever 61 rotates a predetermined angle, thereby the hook 61c press the latch pin 62a, the latch pin 62a presses, pushes up, and passes through a curved back of the hook 65a or 65b of the ratchet 65, and engages with the hook 65a or 65b, as a result a condition in FIG. 16(b) or FIG. 17(b) is made. The selector 62 pressed by the hook 61c of the selection lever 61 is pushed down by biasing force of the spring 66 attached to the sub-tray selector 63, but it is positioned and stopped by the engagement of the latch pin 62a with the hook 65a or 65b of the ratchet 65. That is, the sub-tray selector 63 is accurately positioned, and a predetermined sub-tray 3a, 3b, or 3c can be locked.

Release of the locking condition of the sub-tray 3a, 3b, or 3c is performed as follow: when the main tray 2 is carried out to the disc exchange position, a front edge of the ratchet 65 is pressed and rotated, and the latch pin 62a engaging with the hook 65a or 65b is released and the sub-tray selector 63 is returned to an original position (condition in FIG. 15(a), 15(b), or 15(c)).

FIGS. 18(a) to 18(f) show mode change with rotation of the first cam gear 12. The first cam gear 12 has ribs 66, 66 . . . and ribs 67,67 . . . partially cut out and arranged concentrically on the backside. Sensors 68,69 are disposed striding over passage lines of those ribs respectively, and when these ribs pass through the sensor 68 or 69, light emitted from a light emitting element of the sensor arrives at a photo detector in which an operation signal is detected, or the light is shielded, as a result same signal as the signal detected by the light emitting/receiving elements is counted by a controller comprising a microcomputer, consequently a particular operation can be confirmed and controlled.

Figure 18A:
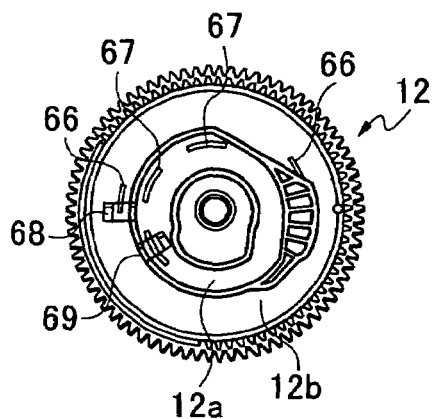

FIG. 18(a) shows an ejection completion position (MODE 1). That is, by pushing an ejection button, the first motor 5 rotates and then the first cam gear 12 rotates, at the same time, the rack conveyance gear 13 rotates, and the main tray is carried out. When the gear arrives at this position, the rotation of the first motor 5 is stopped and the ejection of the main tray 2 is completed.

Figure 18D:
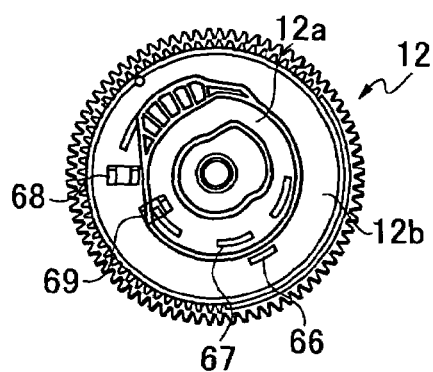
Figure 18B:
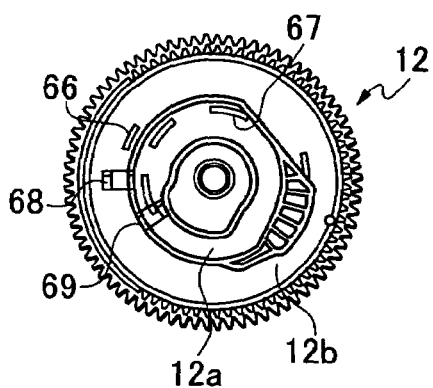

FIG. 18(b) shows a starting position (MODE 2). That is, by pressing a front edge of the main tray 2 by a finger, the main tray 2 is retracted, and then the first cam gear 12 rotates counterclockwise, and when the gear arrives at this position, the first motor 5 starts to work and the main tray 2 is automatically retracted.

Figure 18E:
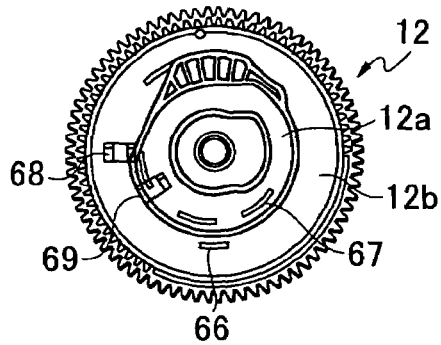
Figure 18C:
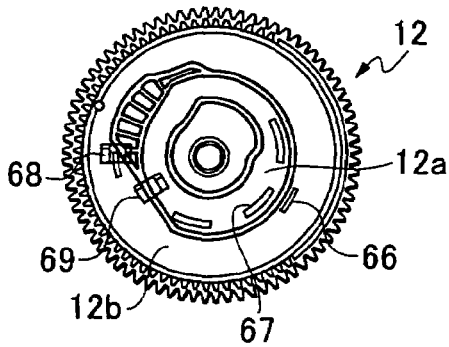

FIG. 18(c) shows a standby position (MODE 3). That is, the rack conveyance gear 13 rotates with the work of the first motor 5, and the main tray 2 is stored in the waiting position, or set in the standby position for the recording and playback operations.

FIG. 18(d) shows a clutch-lever down position (MODE 4). That is, by moving the clutch lever 23 down, the clutch gear 21 mounted on the front edge of the clutch lever is engaged with the second cam gear 22, then moves the traverse unit 39 up and down, and then stopped at a predetermined position. The operation of the clutch lever 23 is performed by pressing an operation button on a front panel of the disc changer in order to select a disc for recording and playback.

FIG. 18(e) shows ejection selection 1 (MODE 5). That is, when a disc is exchanged, the sub-tray 3a at the upper level is locked not to be ejected with the main tray 2. By pressing the operation button on the front panel, the first cam gear 12 rotates, and when the gear arrives at this position, the sub-tray 3a is selected and the front edge 63c of the sub-tray selector 63 fits into the hole 60a in the sub-tray 3a.

Figure 18F:
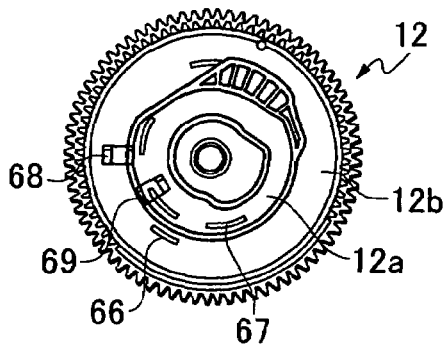

FIG. 18(f) shows ejection selection 2 (MODE 6). That is, when the disc is exchanged, the sub-trays 3a, 3b at the upper and middle levels are locked not to be ejected with the main tray 2. When the first cam gear 12 further rotates and arrives at this position, the sub-trays 3a, 3b are selected. When the main tray 2 is ejected, the disc carried on the sub-tray 3c, which is located at the lower level and appeared here, is exchanged. That is, the front edge 63c of the sub-tray selector 63 fits into the holes 60a, 60a in the sub-trays 3a, 3b.

According to the disc device with the disc changer of the invention, all operations including the lifting and lowering of the traverse unit, conveyance of the main tray and sub-tray, driving of the pickup can be performed using two motors. Each of the operations is performed by switching gears for transmitting power from the motor without using the plunger. Accordingly, an inexpensive device can be provided due to reduction of number of components. In addition, noise accompanied with power switching is prevented, power consumption is reduced, and heat generation or fire can be prevented. Furthermore, electric wiring or a circuit board can be reduced, products are reduced in size and thickness, and a trouble caused by an effect of a magnetic field is prevented.

In addition, since the disc can be mounted and clamped on the turntable in a condition that the sub-tray is accurately positioned by the sub-tray lever, the disc and the turntable are not displaced, and clamping of the disc can be smoothly performed. On the contrary, when the clamped disc is released, since the sub-tray is remained to be positioned, the disc is correctly returned to the sub-tray.

Since disc selection is designed to be performed using a mechanical structure, no electrical trouble occurs, and selection of the sub-tray accompanied with exchange of the disc can be performed correctly and stably.

What is claimed is:

1. A disc device with a disc changer comprising: a sub-tray to carry a disc thereon, a main tray to hold a number of sub-trays in an arranged condition, a first motor to drive the main tray and a second motor to drive the sub-tray, a main-tray conveyance unit to horizontally move the main tray between a disc exchange position and a disc waiting position, a sub-tray conveyance unit to horizontally move the sub-tray between the disc waiting position and a disc playback position, a traverse-unit moving unit to select a sub-tray carrying a disc to be played thereon and vertically move a traverse unit to a position of the sub-tray, a disc playback unit to clamp and play the disc on the sub-tray located in the disc playback position, and a gear switching mechanism to connect or disconnect driving channels of the first motor and the second motor are provided, wherein the gear switching mechanism comprises a first cam gear having first and second cam grooves formed therein and is rotationally driven by the first motor, a clutch lever installed in a back-and-forth swingable manner around a pivot fixed to a body frame and having a back edge slidably fitted into the first cam groove of the first cam gear, a second cam gear having a cam groove formed therein and being connected to the traverse-unit moving unit through the cam groove, and a clutch gear pivotally supported by a front edge of the clutch lever and capable of switching of connection to a channel including a transmission gear engaging with a sub-tray rack for conveying the sub-tray to the playback position, or to a channel including the second cam gear and transmission gears connected to the second motor, whereby the traverse-unit moving unit, the sub-tray conveyance unit, and the disc playback unit are selectively driven through the gear switching mechanism only by the second motor.

2. A disc device with a disc changer according to claim 1, wherein the traverse-unit moving unit comprising: a cam lever having a guide pin engaging with the cam groove of the second cam gear and swings with rotation of the second cam gear, and a pair of slider provided slidably along a respective guide in both sides of the body frame in parallel with each other, each slider being connected to each end of the cam lever and having a step-like cam groove, and the traverse unit engages with the cam groove so that the traverse unit can move vertically with sliding of the slider.

3. A disc device with a disc changer according to claim 2, wherein the sub-tray conveyance unit comprising a sub-tray rack to move vertically together with the traverse unit, the sub-tray rack having a traction portion standing thereon, a hook formed on top end of the traction portion; a latch piece formed on an end of the sub-tray with which the hook of the traction portion engages; a fitting hole formed with the latch piece through which the traction portion can be inserted; and an opening communicating with the fitting hole through which the traction portion without the hook can pass; whereby the hook of the traction portion engages with the latch piece with lifting-and-lowering movement of the sub-tray rack, and the sub-tray is conveyed with movement of the sub-tray rack with rotation of the rack conveyance gear.

4. A disc device with a disc changer according to claim 3, wherein a main gear is mounted on a traverse frame and formed a missing teeth portion on an upper end thereof in such a manner that the main gear can engage with one of the transmission gears connected to the second motor and mounted on the traverse unit and the transmission gear engaged with the main gear is lifted with the traverse unit and positioned in the missing teeth portion of the main gear, thereby power transmission is broken.

5. A disc device with a disc changer according to claim 4, wherein a rack loading is provided as a lifting-and-lowering unit of a front-edge side of the traverse unit having a back-edge side pivotally attached to a traverse frame, which is movable right and left with respect to back-and-forth movement of the sub-tray, and has a guide groove into which a boss provided on a front edge of the traverse unit is freely fitted for guiding up-and-down moving in a predetermined height, a lead-in groove formed at one end side curving approximately at a right angle via a sloping portion into which a guide pin standing at a front edge side of the sub-tray rack advances when the sub-tray rack is conveyed to the disc playback position, and a rack tooth formed on the other end with which a small auxiliary gear provided coaxially on an upper face of the main gear engages; the auxiliary gear having a large tooth and the rack tooth having a latch tooth with which the large tooth engages, thereby allowing transmission of power at a constant timing.

6. A disc device with a disc changer according to claim 5, wherein the rack loading having a sub-tray lever to swing up and down with a shaft as a fulcrum in conjunction with the right-and-left movement of the rack loading for lifting and lowering the front edge side of the traverse unit; the sub-tray lever having an engaging pin jutting out on the front edge; and a positioning hole with which the engaging pin is fittingly engaged is formed in the sub-tray so that the sub-tray is positioned at a predetermined position to prevent the sub-tray from moving when the sub-tray in the waiting position is conveyed to the playback position to mount and clamp a disc on a turntable of the traverse unit and during playback.

7. A disc device with a disc changer according to claim 6, wherein a cam groove to guide up-and-down moving in a predetermined height is formed in the rack loading, and a boss provided on a base of the sub-tray lever is freely fitted into the cam groove.

8. A disc device with a disc changer according to claim 1, wherein it further comprises a selection lever installed in a back-and-forth swingable manner with a pivot fixed to the body frame and swingable with rotation of the first cam gear by fitting a back edge of the selection lever slidably into the second cam groove of the first cam gear; a sub-tray selector interlocking with the selection lever; a through-hole formed in a side portion of each sub-tray; the sub-tray selector being detachably engaged with the through-hole in the sub-tray, and another sub-tray located on an upper side of a predetermined sub-tray on which a disc to be exchanged is set, is locked so that the sub-tray is not carried out along with the main tray.

9. A disc device with a disc changer according to claim 8, wherein the sub-tray selector has a downwardly bent front-edge and is installed in a back-and-forth swingable manner with a pivot fixed to the body frame; a selector to perform reciprocate sliding in conjunction with swinging of a front edge of the selection lever, is provided; the sub-tray selector interlocks with the selection lever via the selector; and the bent front-edge can be detachably engaged with the through-hole in the sub-tray.

10. A disc device with a disc changer according to claim 9, wherein a hook is formed on a front edge of the selection lever, and the hook is engaged with a latch pin provided on the selector for interlock.

11. A disc device with a disc changer according to claim 10, wherein a ratchet is mounted in a swingable manner closely to the selector, and the latch pin provided on the selector is engaged with a hook of the ratchet for positioning and stop operations.

* * * * *